US011847631B2

(12) United States Patent
Martin et al.

(10) Patent No.: US 11,847,631 B2
(45) Date of Patent: Dec. 19, 2023

(54) POINT OF SALE DEVICE WITH CRADLE FOR COMPUTING DEVICE

(71) Applicant: Block, Inc., Oakland, CA (US)

(72) Inventors: Jeremy Martin, San Francisco, CA (US); Mani Razaghi Kashani, San Francisco, CA (US); Nicholas Kunst, San Francisco, CA (US); Brett Andler, San Francisco, CA (US); Steven Stallion, San Francisco, CA (US); Rowan Schultz, San Francisco, CA (US); Yenliang Chen, San Francisco, CA (US); Cory Douthat, San Francisco, CA (US); Marvin Balaoro, San Francisco, CA (US)

(73) Assignee: Block, Inc., Oakland, CA (US)

( * ) Notice: Subject to any disclaimer, the term of this patent is extended or adjusted under 35 U.S.C. 154(b) by 529 days.

(21) Appl. No.: 17/018,938

(22) Filed: Sep. 11, 2020

(65) Prior Publication Data
US 2021/0097522 A1    Apr. 1, 2021

Related U.S. Application Data

(63) Continuation of application No. 16/588,491, filed on Sep. 30, 2019, now Pat. No. 10,810,570.

(51) Int. Cl.
*G06Q 20/32* (2012.01)
*G06F 1/16* (2006.01)
(Continued)

(52) U.S. Cl.
CPC ....... *G06Q 20/3223* (2013.01); *G06F 1/1607* (2013.01); *G06F 1/1622* (2013.01);
(Continued)

(58) Field of Classification Search
CPC .... G06F 1/1607; G06F 1/1622; G06F 1/1601; G06F 1/1626; G06F 1/1632; G06K 7/087;
(Continued)

(56) References Cited

U.S. PATENT DOCUMENTS 3,128,349 A    4/1964   Boesch et al.
4,776,003 A    10/1988  Harris
(Continued)

FOREIGN PATENT DOCUMENTS

AU    2324402 A     6/2002
CN    114930412 A   8/2022
(Continued)

OTHER PUBLICATIONS

New mobile tablets offer more than traditional POS. (2016). Nation's Restaurant News, Retrieved from https://www.proquest.com/trade-journals/new-mobile-tablets-offer-more-than-traditional/docview/1755398779/se-2 (Year: 2016).*

(Continued)

*Primary Examiner* — Ashford S Hayles
(74) *Attorney, Agent, or Firm* — Polsinelli PC

(57) ABSTRACT

A point of sale (POS) device includes a nest portion and a cradle portion. The nest portion includes one or more payment card or near field communication (NFC) readers. The cradle portion couples to differently-sized interchangeable frames, which in turn help secure a mobile computing device to the cradle portion of the POS device. The mobile computing device is connected via a connector to the rest of the POS device. Payment card information read by the readers is conveyed to the mobile computing device over the connector for processing. The POS device may also include tamper detection circuitry.

20 Claims, 25 Drawing Sheets

(51) Int. Cl.
  *G06Q 20/20* (2012.01)
  *G06K 7/08* (2006.01)
  *G06K 7/10* (2006.01)
  *G06Q 20/34* (2012.01)
  *G06K 7/00* (2006.01)
  *G07G 1/00* (2006.01)

(52) U.S. Cl.
  CPC ........... *G06K 7/0004* (2013.01); *G06K 7/087* (2013.01); *G06K 7/10297* (2013.01); *G06K 7/10415* (2013.01); *G06Q 20/204* (2013.01); *G06Q 20/3278* (2013.01); *G06Q 20/341* (2013.01); *G06Q 20/347* (2013.01); *G06Q 20/352* (2013.01); *G07G 1/0018* (2013.01)

(58) Field of Classification Search
  CPC ........... G06K 7/10297; G06K 7/10415; G06K 7/0069; G06Q 20/204; G06Q 20/3278; G06Q 20/322; G06Q 20/202; G07G 1/0018; G07G 1/01; G07F 7/0886; G07F 7/0893; G07F 7/1091
  See application file for complete search history.

(56) References Cited

U.S. PATENT DOCUMENTS

| | | | | |
|---|---|---|---|---|
| 4,860,336 | A | 8/1989 | D'Avello et al. | |
| 5,187,646 | A | 2/1993 | Koch | |
| 5,221,838 | A | 6/1993 | Gutman et al. | |
| 5,351,296 | A | 9/1994 | Sullivan | |
| 5,388,155 | A | 2/1995 | Smith | |
| 5,408,513 | A | 4/1995 | Busch, Jr. et al. | |
| 5,714,741 | A | 2/1998 | Pieterse et al. | |
| 5,729,591 | A | 3/1998 | Bailey | |
| 5,740,232 | A | 4/1998 | Pailles et al. | |
| 5,838,773 | A | 11/1998 | Eisner et al. | |
| 5,850,599 | A | 12/1998 | Seiderman | |
| 5,867,795 | A | 2/1999 | Novis et al. | |
| 5,933,812 | A | 8/1999 | Meyer et al. | |
| 5,940,510 | A | 8/1999 | Curry et al. | |
| 6,010,067 | A | 1/2000 | Elbaum | |
| 6,098,881 | A | 8/2000 | Deland, Jr. et al. | |
| 6,144,336 | A | 11/2000 | Preston et al. | |
| 6,234,389 | B1 | 5/2001 | Valliani et al. | |
| 6,278,779 | B1 | 8/2001 | Bryant et al. | |
| 6,481,623 | B1 | 11/2002 | Grant et al. | |
| 6,886,742 | B2 | 5/2005 | Stoutenburg et al. | |
| 6,990,683 | B2 | 1/2006 | Itabashi | |
| 7,003,316 | B1 | 2/2006 | Elias et al. | |
| 7,066,382 | B2 | 6/2006 | Kaplan | |
| 7,078,792 | B2 | 7/2006 | Lam et al. | |
| 7,083,090 | B2 | 8/2006 | Zuili | |
| 7,163,148 | B2 | 1/2007 | Durbin et al. | |
| 7,210,627 | B2 | 5/2007 | Morley et al. | |
| 7,363,054 | B2 | 4/2008 | Elias et al. | |
| 7,424,732 | B2 | 9/2008 | Matsumoto et al. | |
| 7,433,452 | B2 | 10/2008 | Taylor et al. | |
| 7,591,425 | B1 | 9/2009 | Zuili et al. | |
| 7,673,799 | B2 | 3/2010 | Hart et al. | |
| 7,810,729 | B2 | 10/2010 | Morley, Jr. | |
| 7,896,248 | B2 | 3/2011 | Morley, Jr. | |
| 8,086,531 | B2 | 12/2011 | Litster et al. | |
| 8,126,734 | B2 | 2/2012 | Dicks et al. | |
| 8,265,553 | B2 | 9/2012 | Cheon et al. | |
| 8,397,988 | B1 | 3/2013 | Zuili | |
| 8,602,304 | B2* | 12/2013 | Cohen | H04M 1/04 361/679.06 |
| 8,898,076 | B2* | 11/2014 | Vasquez | G06Q 20/20 705/16 |
| 8,949,144 | B2* | 2/2015 | Kim | G07F 7/088 705/16 |
| 9,020,853 | B2 | 4/2015 | Hoffman et al. | |
| 9,307,131 | B1* | 4/2016 | Breen | G06F 1/1656 |
| 9,558,482 | B2* | 1/2017 | Hicks | G06Q 20/34 |
| 9,600,028 | B2* | 3/2017 | Gathings | G06F 1/1628 |
| 9,633,771 | B2* | 4/2017 | Salmon | H01F 7/0242 |
| 9,679,286 | B2 | 6/2017 | Colnot et al. | |
| 9,740,888 | B1 | 8/2017 | Aga et al. | |
| 10,127,538 | B2* | 11/2018 | Saeed | G06Q 20/208 |
| 10,139,864 | B2* | 11/2018 | Voege | G06F 3/0346 |
| 10,375,217 | B2* | 8/2019 | Saeed | G06Q 20/322 |
| 10,595,400 | B1 | 3/2020 | Razaghi et al. | |
| 10,743,682 | B2* | 8/2020 | Speagle | F16M 11/22 |
| 10,810,570 | B1 | 10/2020 | Martin et al. | |
| 11,191,155 | B1 | 11/2021 | Zhang et al. | |
| 11,373,159 | B2* | 6/2022 | Nieuwborg | G06K 7/0004 |
| 2002/0091633 | A1 | 7/2002 | Proctor | |
| 2002/0153414 | A1 | 10/2002 | Stoutenburg et al. | |
| 2003/0135418 | A1 | 7/2003 | Shekhar et al. | |
| 2003/0154414 | A1 | 8/2003 | von Mueller et al. | |
| 2003/0183691 | A1 | 10/2003 | Lahteenmaki et al. | |
| 2004/0012875 | A1 | 1/2004 | Wood | |
| 2004/0027337 | A1* | 2/2004 | Hunt | G06F 1/1632 345/173 |
| 2004/0041911 | A1 | 3/2004 | Odagiri et al. | |
| 2004/0059682 | A1 | 3/2004 | Hasumi et al. | |
| 2004/0150384 | A1 | 8/2004 | Holle et al. | |
| 2004/0167820 | A1 | 8/2004 | Melick et al. | |
| 2004/0204082 | A1 | 10/2004 | Abeyta | |
| 2005/0097015 | A1 | 5/2005 | Wilkes et al. | |
| 2005/0109841 | A1 | 5/2005 | Ryan et al. | |
| 2005/0236480 | A1 | 10/2005 | Vrotsos et al. | |
| 2005/0275538 | A1 | 12/2005 | Kulpa | |
| 2006/0032905 | A1 | 2/2006 | Bear et al. | |
| 2006/0049255 | A1 | 3/2006 | von Mueller et al. | |
| 2006/0223580 | A1 | 10/2006 | Antonio et al. | |
| 2007/0067833 | A1 | 3/2007 | Colnot | |
| 2007/0096904 | A1 | 5/2007 | Lockyer et al. | |
| 2007/0168300 | A1 | 7/2007 | Quesselaire et al. | |
| 2007/0194104 | A1 | 8/2007 | Fukuda et al. | |
| 2007/0198436 | A1 | 8/2007 | Weiss | |
| 2008/0001929 | A1 | 1/2008 | Wulff | |
| 2008/0091617 | A1 | 4/2008 | Hazel et al. | |
| 2008/0284610 | A1 | 11/2008 | Hunter | |
| 2008/0310094 | A1* | 12/2008 | Burns | G06F 1/1616 361/679.01 |
| 2009/0070583 | A1 | 3/2009 | von Mueller et al. | |
| 2009/0112768 | A1 | 4/2009 | Hammad et al. | |
| 2009/0164326 | A1 | 6/2009 | Bishop et al. | |
| 2010/0052620 | A1 | 3/2010 | Wong | |
| 2010/0057620 | A1 | 3/2010 | Li et al. | |
| 2010/0177487 | A1 | 7/2010 | Arshad et al. | |
| 2010/0243732 | A1 | 9/2010 | Wallner | |
| 2013/0278122 | A1* | 10/2013 | Edwards | G06F 1/1632 312/333 |
| 2013/0282501 | A1* | 10/2013 | Edwards | G07G 1/0018 705/17 |
| 2013/0290591 | A1* | 10/2013 | Schwarzkopf | G06F 1/1632 710/303 |
| 2013/0294020 | A1 | 11/2013 | Rayner et al. | |
| 2014/0028243 | A1 | 1/2014 | Rayner | |
| 2014/0059263 | A1* | 2/2014 | Rosenberg | G06F 1/1632 710/303 |
| 2014/0108172 | A1* | 4/2014 | Weber | G06Q 30/00 705/17 |
| 2014/0191034 | A1* | 7/2014 | Glanzer | G06K 7/089 235/449 |
| 2014/0217862 | A1* | 8/2014 | Rayner | G06F 1/1626 312/223.1 |
| 2014/0249944 | A1* | 9/2014 | Hicks | G07G 1/0081 235/383 |
| 2014/0279107 | A1* | 9/2014 | Vasquez | G07G 1/0081 705/21 |
| 2014/0279116 | A1* | 9/2014 | Vasquez | G06Q 20/3227 705/21 |
| 2014/0347814 | A1* | 11/2014 | Zaloom | G06F 1/1626 248/688 |
| 2015/0001291 | A1* | 1/2015 | Govindarajan | G06Q 20/208 235/380 |
| 2015/0103018 | A1 | 4/2015 | Kamin-Lyndgaard et al. | |
| 2015/0149311 | A1* | 5/2015 | Ward | G07G 1/0018 705/24 |

(56) References Cited

U.S. PATENT DOCUMENTS

| | | | |
|---|---|---|---|
| 2015/0185768 A1* | 7/2015 | Voege | G06F 3/03 455/575.8 |
| 2015/0199882 A1* | 7/2015 | Fernando | G07G 1/0018 345/173 |
| 2015/0199887 A1 | 7/2015 | Rosny et al. | |
| 2015/0201723 A1 | 7/2015 | Rayner et al. | |
| 2015/0277491 A1* | 10/2015 | Browning | G06F 1/1632 248/346.03 |
| 2015/0365121 A1* | 12/2015 | Smith | G06F 1/1626 455/575.8 |
| 2016/0055357 A1 | 2/2016 | Hicks et al. | |
| 2016/0111232 A1 | 4/2016 | Wolfe et al. | |
| 2016/0125181 A1* | 5/2016 | Dai Zovi | G06F 21/36 726/19 |
| 2016/0203455 A1 | 7/2016 | Hicks et al. | |
| 2016/0224065 A1* | 8/2016 | Weldon | G06F 1/1632 |
| 2016/0253649 A1* | 9/2016 | Govindarajan | G06Q 20/206 705/17 |
| 2016/0275478 A1 | 9/2016 | Li et al. | |
| 2016/0342874 A1 | 11/2016 | Powell et al. | |
| 2017/0140363 A1* | 5/2017 | Hicks | G06K 7/10297 |
| 2018/0039965 A1* | 2/2018 | Han | G06Q 20/202 |
| 2018/0068300 A1* | 3/2018 | Saeed | G06Q 20/40145 |
| 2018/0116058 A1* | 4/2018 | Sullivan | G06F 1/1607 |
| 2018/0314661 A1* | 11/2018 | Douthat | G06F 13/385 |
| 2018/0316815 A1* | 11/2018 | Douthat | G06Q 20/209 |
| 2019/0034668 A1* | 1/2019 | Novoa | G06F 1/1632 |
| 2019/0034902 A1* | 1/2019 | Bukovics | G06F 13/10 |
| 2019/0251802 A1* | 8/2019 | Luo | G07G 1/0045 |
| 2020/0058008 A1* | 2/2020 | Hicks | G06K 7/0004 |
| 2021/0182442 A1* | 6/2021 | Slaney | C09J 7/38 |
| 2021/0185802 A1 | 6/2021 | Slaney et al. | |
| 2021/0201289 A1 | 7/2021 | Martin et al. | |

FOREIGN PATENT DOCUMENTS

| | | | | |
|---|---|---|---|---|
| DE | 20320080 U1 | 4/2004 | | |
| EP | 0 895 203 A2 | 2/1999 | | |
| EP | 1 874 014 A2 | 1/2008 | | |
| EP | 2645343 A2 * | 10/2013 | | G06F 1/1632 |
| EP | 2645343 B1 * | 9/2017 | | G06F 1/1632 |
| EP | 4 038 586 A1 | 8/2022 | | |
| FR | 2 812 744 A1 | 2/2002 | | |
| FR | 2 812 745 A1 | 2/2002 | | |
| FR | 2 834 156 A1 | 6/2003 | | |
| GB | 2524593 A * | 9/2015 | | G06F 1/1626 |
| JP | H09231285 A | 9/1997 | | |
| JP | 2000-030146 A | 1/2000 | | |
| JP | 2000-276539 A | 10/2000 | | |
| JP | 2001-222595 A | 8/2001 | | |
| JP | 2002-074507 A | 3/2002 | | |
| JP | 2002-123771 A | 4/2002 | | |
| JP | 2002-279320 A | 9/2002 | | |
| JP | 2002-352166 A | 12/2002 | | |
| JP | 2002-358285 A | 12/2002 | | |
| JP | 2003-008324 A | 1/2003 | | |
| JP | 2003-108777 A | 4/2003 | | |
| JP | 2003-281453 A | 10/2003 | | |
| JP | 2003-308438 A | 10/2003 | | |
| JP | 2004-054651 A | 2/2004 | | |
| JP | 2004-062733 A | 2/2004 | | |
| JP | 2004-078553 A | 3/2004 | | |
| JP | 2004-078662 A | 3/2004 | | |
| JP | 2004-199405 A | 7/2004 | | |
| JP | 4248820 B2 | 4/2009 | | |
| KR | 10-1999-0066397 A | 8/1999 | | |
| KR | 10-1999-0068618 A | 9/1999 | | |
| KR | 200225019 B1 | 3/2001 | | |
| KR | 10-2003-0005936 A | 1/2003 | | |
| KR | 10-2003-0005984 A | 1/2003 | | |
| KR | 10-2003-0012910 A | 2/2003 | | |
| KR | 200333809 B1 | 11/2003 | | |
| KR | 10-2004-0016548 A | 2/2004 | | |
| KR | 100447431 B1 | 8/2004 | | |
| KR | 200405877 B1 | 1/2006 | | |
| KR | 100649151 B1 | 11/2006 | | |
| KR | 10-2007-0107990 A | 11/2007 | | |
| KR | 100842484 B1 | 6/2008 | | |
| RU | 2284578 C1 | 9/2006 | | |
| WO | 1998/012674 A2 | 3/1998 | | |
| WO | 2000/011624 A1 | 3/2000 | | |
| WO | 2000/025277 A1 | 5/2000 | | |
| WO | 01/63994 A2 | 8/2001 | | |
| WO | 2001/086599 A2 | 11/2001 | | |
| WO | 2002/033669 A1 | 4/2002 | | |
| WO | 2002/043020 A2 | 5/2002 | | |
| WO | 2002/082388 A1 | 10/2002 | | |
| WO | 2002/084548 A1 | 10/2002 | | |
| WO | 2003/044710 A1 | 5/2003 | | |
| WO | 2003/079259 A1 | 9/2003 | | |
| WO | 2004/023366 A1 | 3/2004 | | |
| WO | 2006/131708 A1 | 12/2006 | | |
| WO | WO-2011146774 A1 * | 11/2011 | | A45C 11/00 |
| WO | WO-2014056100 A1 * | 4/2014 | | G06F 1/1632 |
| WO | 2018/098373 A1 | 5/2018 | | |
| WO | 2019/183227 A1 | 9/2019 | | |
| WO | WO-2019183227 A1 * | 9/2019 | | F16M 11/041 |
| WO | 2021/067117 A1 | 4/2021 | | |

OTHER PUBLICATIONS

Tablet technology bridges hospitality, customer engagement (2016). Posiflex, whitepaper. (Year: 2016).*

Rodrigues, Helena et al. "MobiPag: Integrated Mobile Payment, Ticketing and Couponing Solution Based on NFC." Sensors (Basel, Switzerland) 14.8 (2014): 13389-13415. Web. (Year: 2014).*

Pullen, John Patrick. "Put It on My Tablet." Entrepreneur (Santa Monica, Calif.) (2012): 41-. Print. (Year: 2012).*

"Cellebrite Launches Touchscreen Point of Sale Tablet." Total telecom (2011): n. pag. Print. (Year: 2011).*

Spegele, Joseph Brain., "A Framework for Evaluating Application of Smart Cards and Related Technology Within the Department of Defense," Naval Postgraduate School, Jan. 1995.

Stephen A. Sherman et al., "Secure Network Access Using Multiple Applications of AT&T's Smart Card," AT&T Technical Journal, Sep./Oct. 1994.

Non-Final Office Action dated Jan. 30, 2020, for U.S. Appl. No. 16/588,491, of Martin , J., et al., filed Sep. 30, 2019.

Notice of Allowance dated Jun. 10, 2020, for U.S. Appl. No. 16/588,491, of Martin , J., et al., filed Sep. 30, 2019.

International Search Report and Written Opinion for International Application No. PCT/US2020/52539, dated Jan. 28, 2021.

Non-Final Office Action dated Sep. 2, 2022, for U.S. Appl. No. 16/588,499, of Slaney, N., et al., filed Sep. 30, 2019.

"Connection of Terminal Equipment to the Telephone Network," FCC 47 CFR Part 68, Retrieved from the URL: http://www.tscm.com/FCC47CFRpart68.pdf, on Sep. 24, 2019 Oct. 1, 1999 Edition.

"EMBEDDED FINancial transactional IC card READer," Retrieved from the URL: https://cordis.europa.eu/project/rcn/58338/factsheet/en.

Geethapriya Venkataramani and Srividya Gopalan., "Mobile phone based RFID architecture for secure electronic payments using RFID credit cards," 2007 IEEE, (ARES'07).

"Guideline for the Useof Advanced Authentication Technology," FIPS 190, Sep. 28, 1994.

"Identification cards—Recording technique—Part 4—Location of read-only magnetic tracks—Track 1 and 2," ISO/IEC 7811-4:1995, International Organization for Standardization, Aug. 1995.

Jerome Svigals., "The Long Life and Imminent Death of the Mag-stripe Card," IEEE Spectrum, vol. 49, Issue 61, Jun. 2012.

"Magensa's Decryption Services and MagTek's MagneSafe™ Bluetooth Readers Selected by eProcessing Network to Implement Secure Customer Card Data with Mobile Devices," Retrieved from the URL: https://www.magnensa.net/aboutus/articles/eProcessing—rev1.pdf Apr. 14, 2008.

Martha E. Haykin et al., "Smart Card Technology: New Methods for Computer Access Control," NIST Special Publication 500-157, Sep. 1988.

(56) References Cited

OTHER PUBLICATIONS

"MSP430x1xx Family User's Guide," (including 2016 correction sheet at 2), Texas Instruments Inc., 2006.
Non-Final Office Action dated Apr. 26, 2022, for U.S. Appl. No. 16/588,511, of Slaney, N., et al, filed Sep. 30, 2019.
Computer Workstations, "TCXFlight Mobile Solution Functions as Workstation" vol. 27, No. 2 Boston: Worldwide Videotex, Year: 2014, 3 pages.
Davis et al., "A Mobile Retail POS: Design and Implementation." Proceedings of the 2015 Workshop on Mobile Big Data. ACM, pp. 49-51 (Year: 2015).
Poeter et al., "The Next (Not So) Big Thing—A New Breed of Mobile Devices Packs the Power of a Full-blown PC into a Tiny Package: The Newsweekly for Builders of Technology Solutions" ProQuest, Feb. 18, 2008, 13 pages.

\* cited by examiner

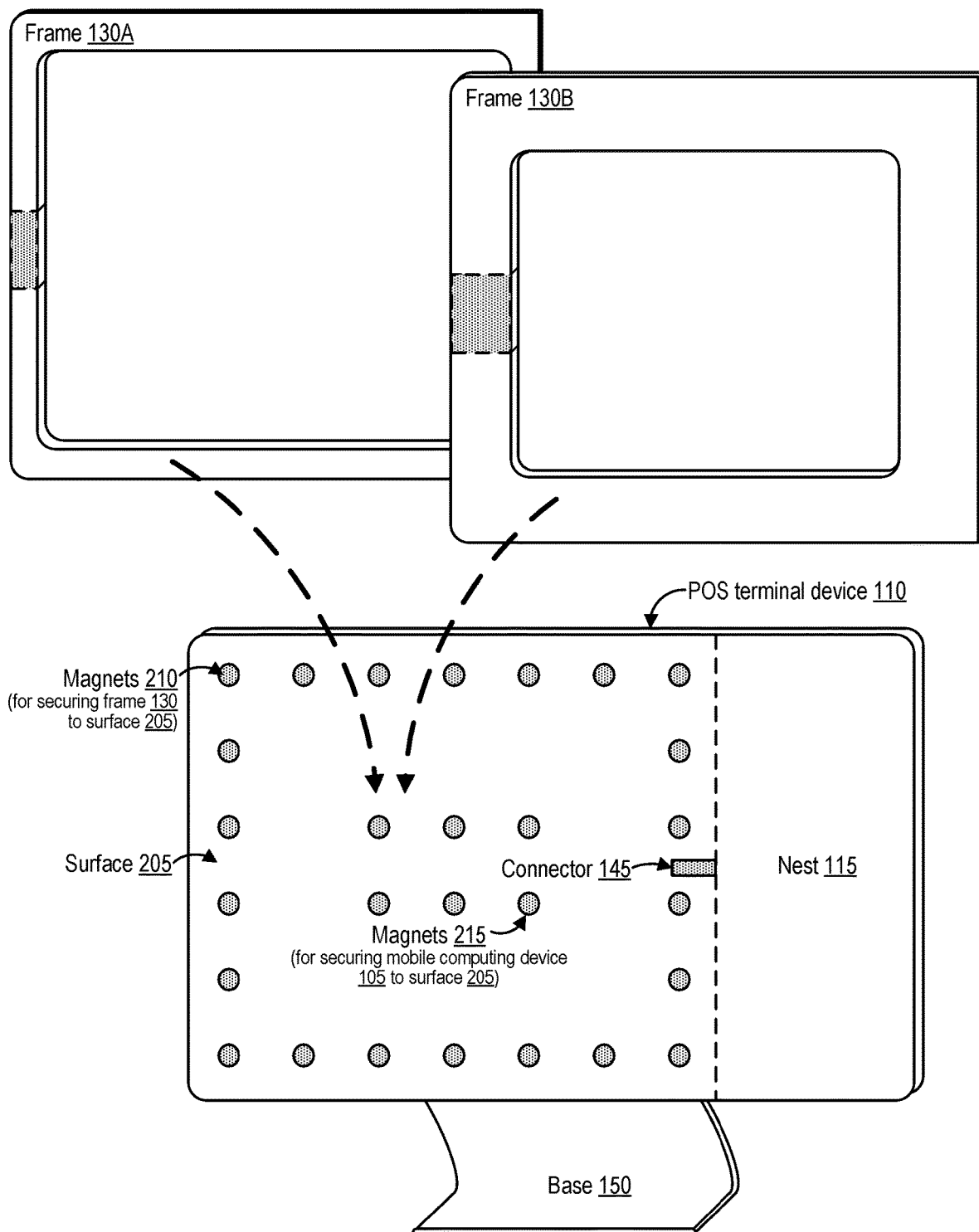

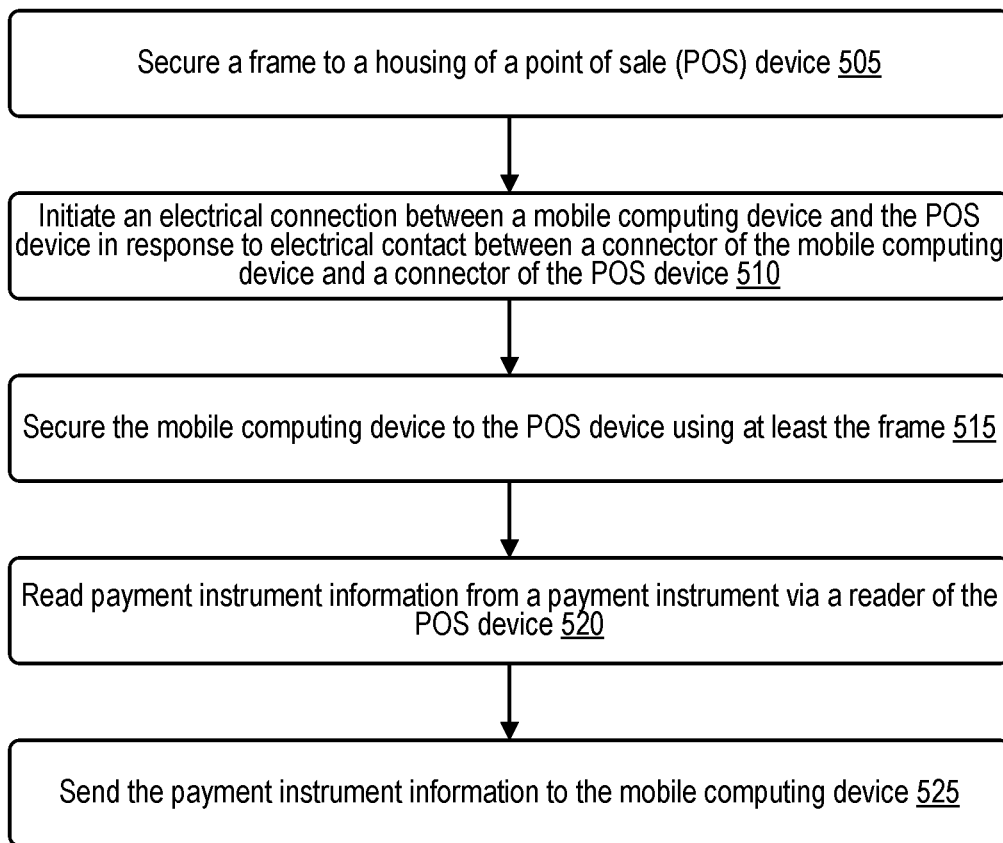

Curved NFC antenna coil 610

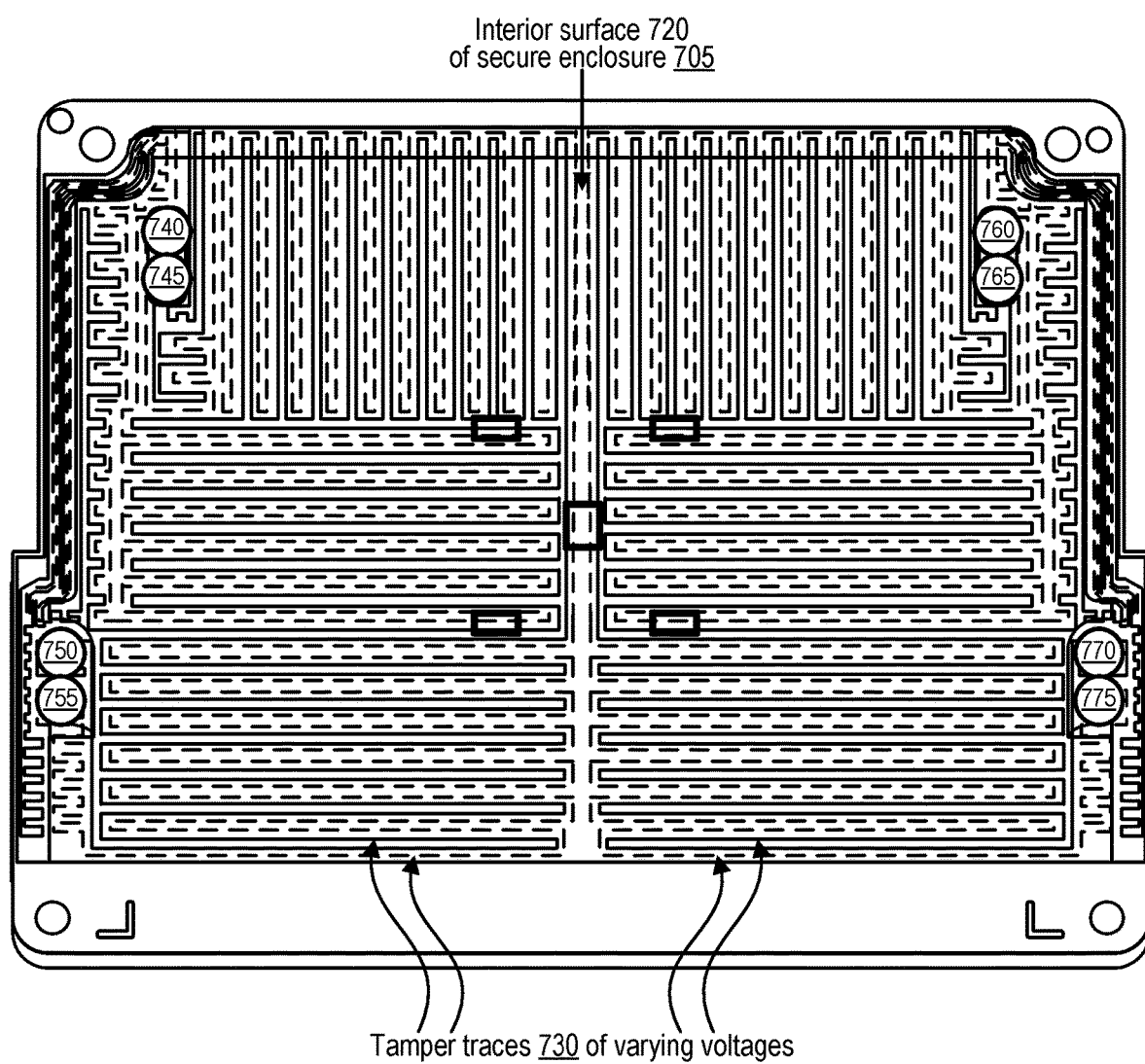

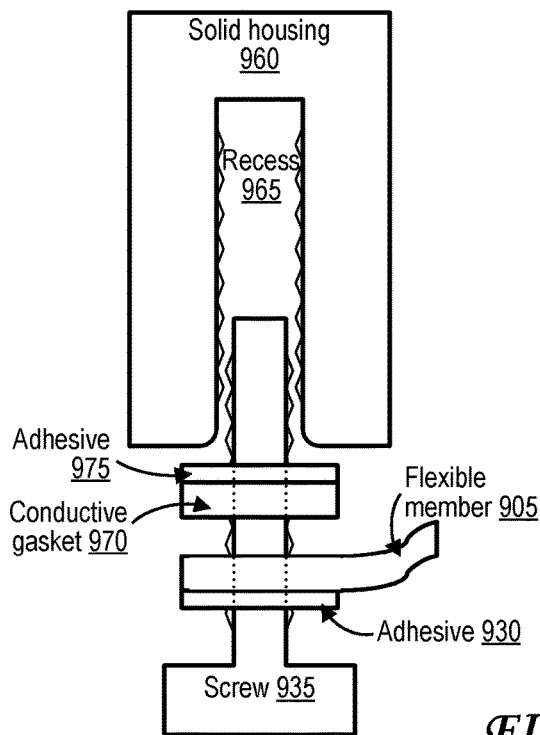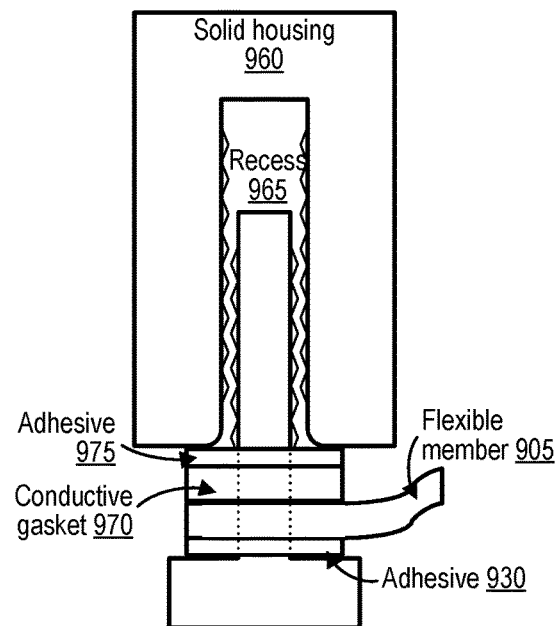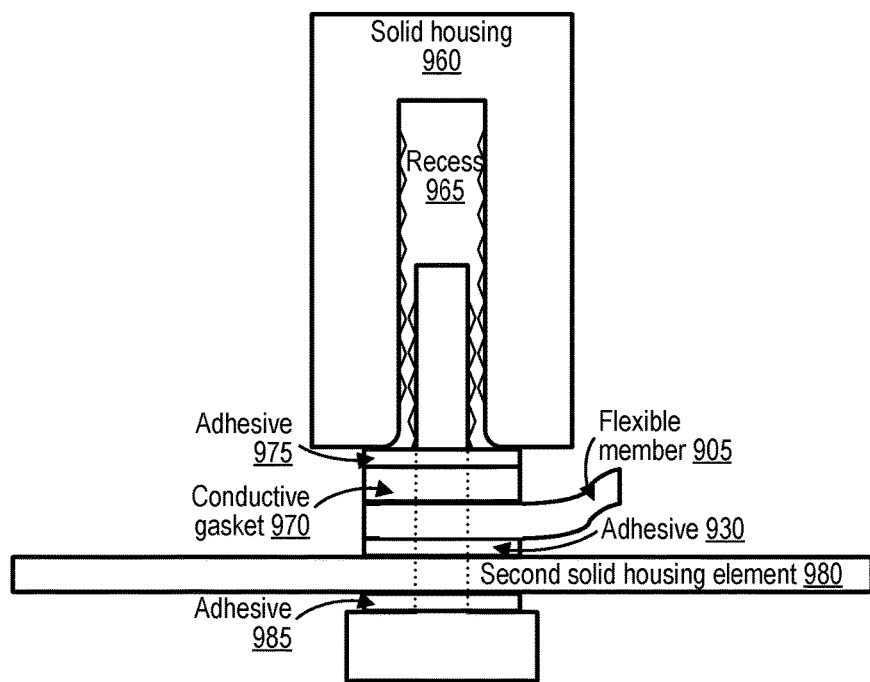

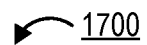

FIG. 17

Identify that a tamper detection circuit is closed, wherein the tamper detection circuit includes a first exposed conductive area and a second exposed conductive area of a flexible member, wherein the flexible member includes an aperture through which a portion of a fastener passes while a recess receives the portion of the fastener, wherein the first exposed conductive area is electrically connected to the second exposed conductive area and the tamper detection circuit is closed while the recess receives the portion of the fastener 1710

Detect a tamper attempt by identifying that the tamper detection circuit is open 1720

FIG. 18

Identify that a tamper detection circuit is closed, wherein the tamper detection circuit includes at least one of a plurality of conductive traces of a flexible member, wherein each of the plurality of conductive traces run between an anterior end of the flexible member and a posterior end of the flexible member, wherein the tamper detection circuit is closed while the anterior end of the flexible member is connected to a first connector and the posterior end of the flexible member is connected to a second connector 1810

Detect a tamper attempt by identifying that the tamper detection circuit is open 1820

POINT OF SALE DEVICE WITH CRADLE FOR COMPUTING DEVICE

CROSS-REFERENCE TO RELATED APPLICATIONS

This application claims priority to and is a continuation of U.S. patent application Ser. No. 16/588,491, filed on Sep. 30, 2019, entitled "POINT OF SALE DEVICE WITH CRADLE FOR MOBILE COMPUTING DEVICE," the entirety of which is herein incorporated by reference.

BACKGROUND

Payment cards, such as credit cards and debit cards, are often used by customers during transactions with merchants. Merchants can read payment information from payment cards using payment card reader devices. Payment card reader devices include magnetic stripe reader devices that read payment card information from a magnetic stripe of a payment card that is swiped through a slot, Europay/Mastercard/Visa (EMV) chip reader devices that read payment card information from an EMV chip of a payment card that is inserted into a slot, or near field communication (NFC) reader devices that read payment card information wirelessly from an NFC-enabled payment card. Payment card reader devices read the payment card from a payment card, then send that payment card information to a server associated with a financial entity, such as a bank or credit card institution, in order to process the transaction by transferring funds from a customer account to a merchant account.

Mobile computing devices, such as smartphones or tablet computers, are computing devices with a mobile and/or portable form factor. Mobile computing devices typically include a display screen and an input interface, such as a touchscreen touch interface of the display screen. Mobile computing devices are increasingly popular, but come in a wide range of different sizes and form factors. As a result, interfacing a particular mobile computing device with another device can be difficult, because while a bracket or other elements made for holding or otherwise securing a mobile computing device might be compatible with some mobile computing device form factors and sizes, it might not be compatible with all mobile computing device form factors and sizes. For example, manufacturers often change device thickness, size, ports, port locations, or other form factor elements from one version of a mobile computing device to the next, often meaning that a newer model of a mobile computing device breaks compatibility with an interface that an older version of the same mobile computing device worked well with.

Merchant point of sale (POS) devices are systems that are used by merchants to enter items or services requested by a customer, retrieve prices for each item or service, calculate a total, and in some cases prepare a receipt or invoice to be printed and given to the customer before or after payment processing.

There is a need for systems and methods for a secure payment processing system that flexibly and intuitively interfaces with a variety of mobile computing devices.

BRIEF DESCRIPTION OF THE DRAWINGS

FIG. 2 illustrates a point of sale (POS) terminal device with interchangeable frames for securing different mobile computing devices with different form factors.

FIG. 5 is a flow diagram illustrating operations of a point of sale (POS) terminal device with a removable frame.

FIG. 7B illustrates an interior of a secure enclosure that encloses and connects to a circuit board.

FIG. 9C illustrates an exploded side view of the tamper detection system that detects tampering with a screw.

FIG. 9D illustrates a side view of the tamper detection system of FIG. 9C in a secure state.

FIG. 9E illustrates a side view of the tamper detection system of FIG. 9D with a second solid housing element.

FIG. 17 is a flow diagram illustrating operations of a tamper detection system that detects tampering with a fastener.

FIG. 18 is a flow diagram illustrating operations of a tamper detection system that detects tampering with a flexible member that is connected to two connectors.

DETAILED DESCRIPTION

A point of sale (POS) terminal device includes a nest portion and a cradle portion. The nest portion includes one or more payment card or near field communication (NFC) readers. The cradle portion couples to differently-sized interchangeable frames, which in turn help secure a mobile computing device to the cradle portion of the POS terminal device. The mobile computing device is connected via a connector to the rest of the POS terminal device. Payment card information read by the readers is conveyed to the mobile computing device over the connector for processing. The POS terminal device may also include tamper detection circuitry.

The point of sale (POS) device may include a flexible member with two exposed conductive areas that are part of a tamper detection circuit. While a recess receives a screw, the screw passes through apertures in the flexible member and in a conductive gasket, and the conductive gasket connects the two exposed conductive areas to one another, closing the tamper detection circuit. Adhesives affix the flexible member to the screw and the conductive gasket to the recess opening so that removing the screw from the recess separates the conductive gasket from the two exposed conductive areas, opening the tamper detection circuit.

The point of sale (POS) device may include tamper detection circuitry in which one or more flexible members that each include multiple side-by-side conductive traces connect two circuit boards, optionally so that one circuit board must remain very close to the other if the device remains in a secure un-tampered-with state. Severance of a trace of the flexible member, or disconnection of the flexible member from either circuit board, may result in unexpected voltage sensor readings indicative of a tamper attempt.

Figure 1A:
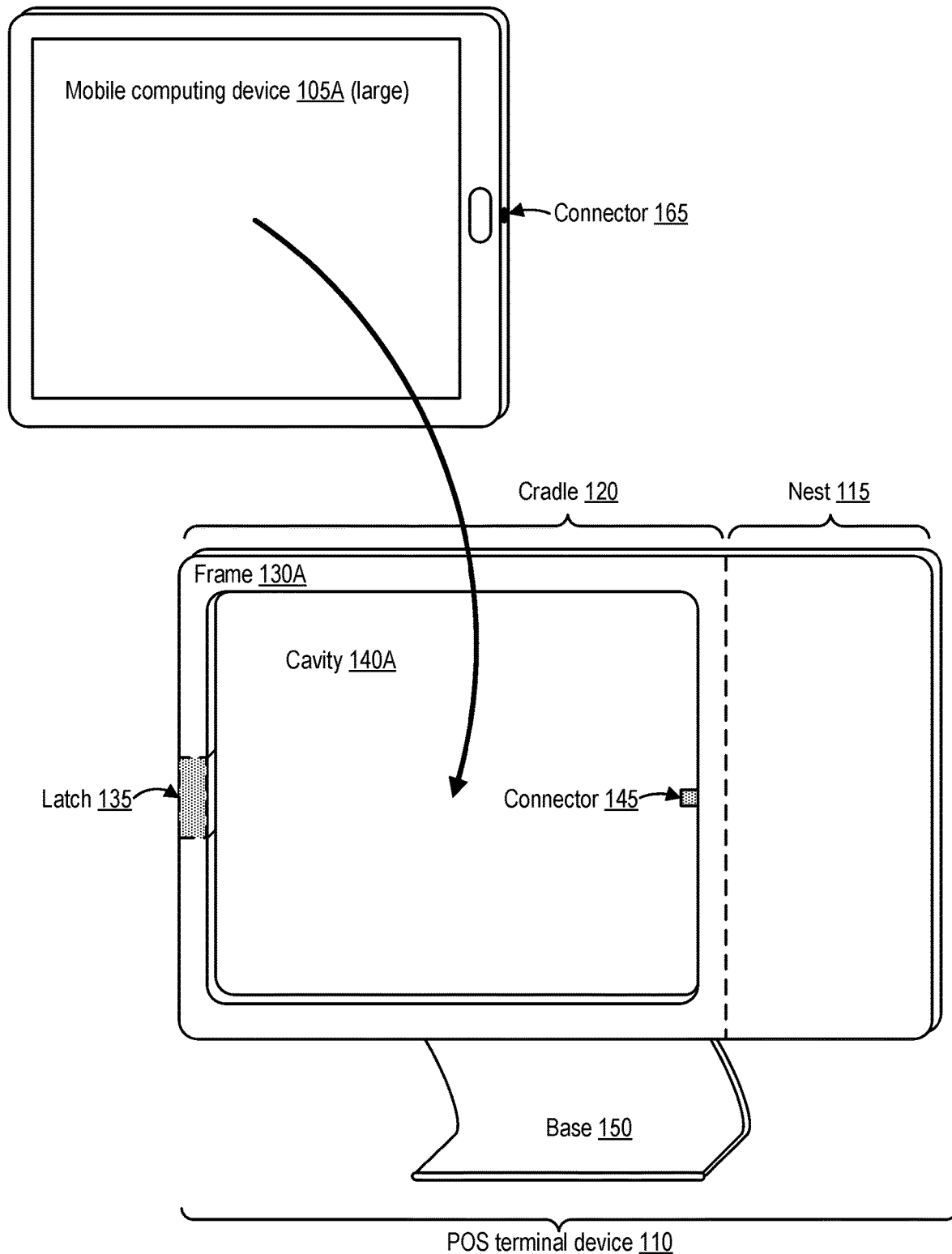
FIG. 1A illustrates a point of sale (POS) terminal device that holds and interfaces with a first mobile computing device that has a first form factor.

FIG. 1A illustrates a point of sale (POS) terminal device that holds and interfaces with a first mobile computing device that has a first form factor.

The POS terminal device 110 of FIG. 1A includes a portion referred to as the nest 115 and a portion referred to as the cradle 120. The nest 115 includes one or more payment instrument readers. For example, the nest 115 may include a magnetic stripe reader that reads payment instrument information from a magnetic stripe of a payment instrument, such as a payment card. The nest 115 may include an integrated circuit (IC) chip reader that reads payment instrument information from an IC chip of a payment instrument, such as a payment card. The IC chip may, for example, be a Europay-Mastercard-Visa (EMV) chip, a smart card chip, a subscriber identity module (SIM) card chip, or an IC chip with a similar design. The nest 115 may include a near field communication (NFC) reader that reads payment instrument information wirelessly from a wireless signal received from an NFC transmitter or NFC transceiver of a payment instrument. The NFC transmitter or NFC transceiver of the payment instrument may be an active NFC transmitter/transceiver or passive NFC transmitter/transceiver. In some cases, the nest 115 may be referred to as a payments area, or a payments section, or a payments portion, or a transaction area, or a transaction section, or a transaction portion of the POS terminal device 110. In some cases, the term "nest 115" as used herein may alternately refer to any part of the POS terminal device 110 other than the mobile computing device 105 and/or the frame 130 and/or the base 150. In other words, the term "nest 115" may also include the cradle 120, and in some cases the frame 130 and/or the base 150. Thus, electronics or other components discussed herein as residing within the nest 115, or at least partially residing in the nest 115, may in some cases at least partially reside in the cradle 120 (and/or the frame 130 and/or the base 150) instead of or in addition to at least partially residing in the nest 115.

The cradle 120 of the POS terminal device 110 receives a mobile computing device 105A and secures the mobile computing device 105A to the POS terminal device 110 via a frame 130A. The frame 130A includes a supportive border barrier structure that extends from a surface 205 of the cradle 120, forming a cavity 140A in a central area around which the supportive border barrier structure of the frame 130A extends. The size of the cavity 140A depends on the thickness of the frame 130A. The thickness along each of the sides of the frame 130A may be designed so that the cavity 140A is sized to secure the mobile computing device 105A in place.

The frame 130A itself may be removable. Thus, when in a secured state, the frame 130A is secured to a surface 205 of the cradle 120. When in an unsecured state, the frame 130A is separate from the surface 205 of the cradle 120, as visible in FIG. 2. The frame 130A may be one of many interchangeable frames 130, with each frame having different border thicknesses that accommodate different sizes and form factors of mobile computing devices 105. In particular, the cradle 120 of FIG. 1A includes a first interchangeable frame 130A with a cavity 140A sized to fit the mobile device 105A of FIG. 1A. In some cases, at least part of the mobile computing device 105 fits snugly within at least part of the cavity 140A, so that the supportive border barrier structure of the frame 130 holds the mobile computing device 105 securely in place even when a user applies forwards or sideways pressure by using a touchscreen interface, button interface, or other interface of the mobile computing device 105, or when a user is swiping or inserting a payment card into a payment card reader of the nest 115.

The side of the mobile computing device 105A with the connector 165 may be referred to as the bottom of the mobile computing device 105A, and the side of the POS terminal device 110 that is coupled to the stand 150 may be referred to as the bottom of the POS terminal device 110. In this case, the thickness of the left side border of the frame 130A and the thickness of the right side border of the frame 130A together impact the width of the cavity 140A, which in turn impacts the height of the mobile computing 105A that fits into the cavity 140A. Similarly, the thickness of the top side border of the frame 130A and the thickness of the bottom side border of the frame 130A together impact the height of the cavity 140A, which may in turn impact the width of the mobile computing 105A that fits into the cavity 140A. Different frames, such as the frame 130B of FIG. 1B, may include different thicknesses of one or more of the borders on one or more sides of the frame in order change the size of the cavity to fit a differently sized mobile computing device. Thicker frame borders in a frame 130 generally correspond to less space in the cavity 140, while thinner frame borders in a frame 130 generally correspond to more space in the cavity 140.

A connector 145 may extend from the nest 115 into the cradle 120, and may connect to a corresponding connector 165 of the mobile computing device 105A to connect the mobile computing device 105A to the nest 115. In FIG. 1A, the connector 145 of the POS terminal device 110 is a plug, and the connector 165 of the mobile computing device 105A is a port, with the plug fitting into the port to form a connection. In other cases, the opposite may be true in that the connector 145 may be a port and the connector 165 may be the corresponding plug. In other cases still both connector 145 and connector 165 may be wireless connectors, such as inductive connectors, near field communication (NFC) connectors (receivers, transmitters, or transceivers), any other type of wireless connector discussed herein, or some combination thereof.

Figure 19:
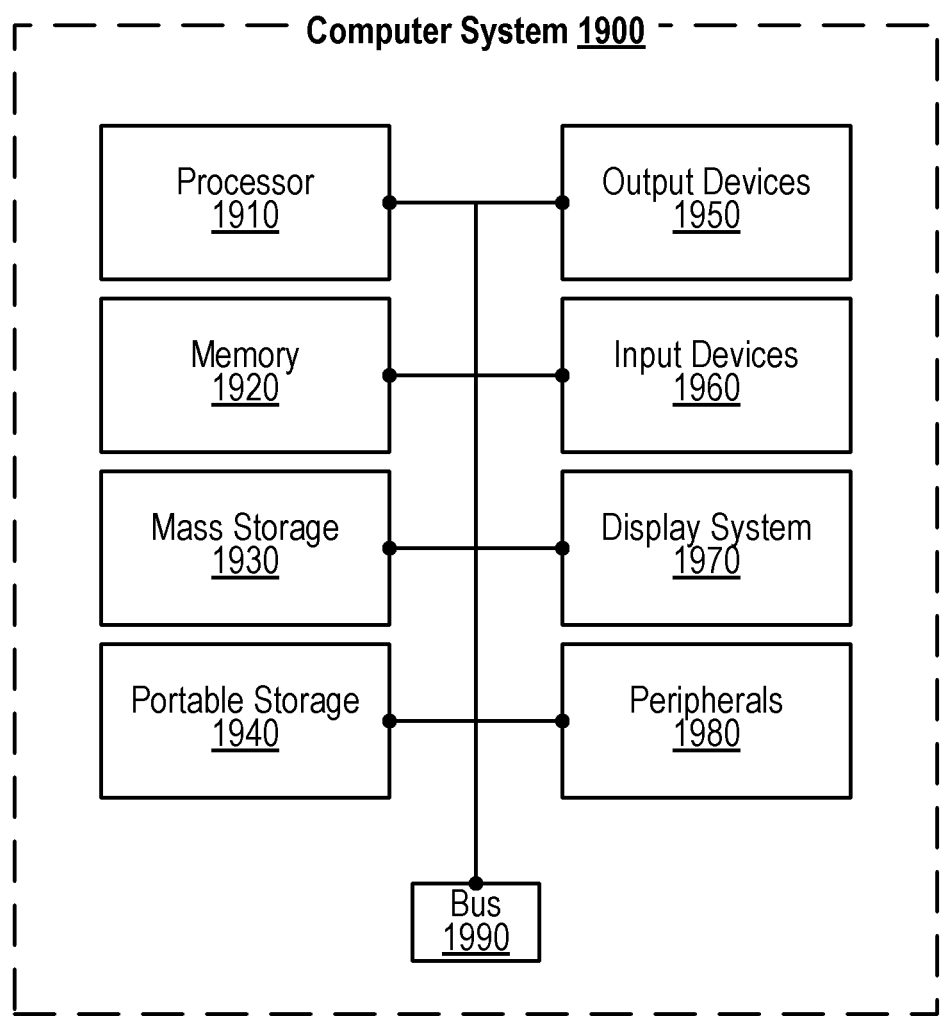
FIG. 19 is a block diagram of an exemplary computing device that may be used to implement some aspects of the technology.

In some cases, the nest 115 may include a computing device 1900 as illustrated in and discussed with respect to FIG. 19, or may include at least some components of a computing device 1900, such as one or more processors 1910 or memory components 1920/1930/1940. The memory component(s) of the nest 115 may, for example, store one or more symmetric or asymmetric encryption keys, which the processor(s) of the nest 115 may use to encrypt the payment instrument information read from a payment instrument by the one or more payment instrument readers of the nest 115 before sending the payment instrument information to the mobile computing device 105 over the connector 145. In some cases, the mobile computing device 105 may then send a payment amount along with the encrypted payment instrument information to one or more payment processing servers, which may be associated with a payment service or with a financial entity such as a bank or credit card processing entity. The one or more payment processing servers may then identify an account associated with the customer, such as the customer's bank or debit account, or a credit card account associated with the customer, and transfer funds in the payment amount from the account associated with the customer to an account associated with a merchant, such as the merchant's bank account or debit account. Alternately, the nest 115 may include one or more communication transmitters or transceivers through which the nest 115 sends the payment instrument information to the one or more payment processing servers for payment processing.

The mobile computing device 105A may be a computing device 1900 as illustrated in and discussed with respect to FIG. 19, or may include at least some components of a computing device 1900, such as one or more processors 1910 or memory components 1920/1930/1940. The mobile computing device 105A is illustrated as a tablet device in FIG. 1A, but may be any type of computing device 1900 discussed with respect to FIG. 19. In some cases, the mobile computing device 105A may store instructions corresponding to merchant software or POS software. Execution of the instructions by one or more one or more processors 1910 of the mobile computing device 105A run the merchant software or POS software, which allows a merchant or customer to identify items or services that the customer wishes to purchase, for example by selecting, using a touchscreen interface and/or button-based and/or voice-based interface, identifiers representing the items or services that the customer wishes to purchase. The identifiers may in some cases include text and/or images and/or codes displayed by a display screen 19770 of the mobile computing device 105A. In some cases, the mobile computing device 105A or POS terminal device 110 may include one or more peripheral connectors or hubs that connect to one or more peripherals, such as bar code scanners or scales. In some cases, the merchant may use a bar code scanner peripheral to scan barcodes on the items (or on packaging of the items) and/or to scan barcodes on items associated with the services in order to input the identifiers corresponding to the items and/or services into the mobile computing device 105A. The mobile computing device 105A may access a pricing database or other data structure that identifies prices corresponding to the each of the items or services selected by the customer or merchant for purchase. The database or other data structure may be at least partially locally stored at the mobile computing device 105A, and/or may be at least partially remotely stored and accessible via a network connection of the mobile computing device 105A. The mobile computing device 105A may then tabulate each of the prices and calculate the sum, resulting in a subtotal payment amount. The mobile computing device 105A may in some cases add additional payments onto the subtotal payment amount to calculate a total payment amount. These additional payments may include one or more tips, gratuities, taxes, fees, other additional payment amounts, or some combination thereof.

The frame 105A includes a latch 135, which may be used to help secure the mobile computing device 105A to the POS terminal device 110 within the cavity 140A. Some examples of a latch 135 and its use are illustrated in FIGS. 4A, 4B, 4C, 4D, and 4E.

The housing of the POS terminal device 110, which includes the cradle 120 and the nest 115, may be rotatably coupled to a base 150. That is, the base may rotate or swivel about the base so that the display of the mobile computing device 105A faces different a direction depending on the rotation angle. In some cases, the housing may be able to rotate endlessly about the base, 360 degrees or more. In other cases, the rotation of the housing about the base may be limited, for example from one angle corresponding to a merchant being able to see and use the display of the mobile computing device 105A (a merchant rotation position or a merchant rotation orientation) to another angle corresponding to the customer being able to see and use the display of the mobile computing device 105A (a customer rotation position or a customer rotation orientation), with these angles for example being 180 degrees apart. In some cases, the base 150 may include one or more dampeners that slow or lock movement at certain positions, such as the merchant and customer positions, and thus require additional force to rotate the housing about the base out of those positions. The dampeners may include, for example, springs, ramps, or magnets.

The base may also include sensors or mechanisms that that can be used to detect a rotational orientation or position of the housing about the base and convey that detected position/orientation to the mobile computing device 105A and/or to the POS terminal device 110. Examples of such sensors or mechanisms may include switches, light sensors, Hall effect sensors, accelerometers, gyroscopes, inertial measurement units (IMUs), or combinations thereof. Alternately, sensors within the mobile computing device 105A and/or nest 115 may be used to detect the rotational orientation or position of the housing about the base, for example accelerometers, gyroscopes, inertial measurement units (IMUs), light sensors, infrared sensors, and/or cameras within the mobile computing device 105A and/or nest 115. The mobile computing device 105A can use rotational position/orientation information to change the graphical user interface (GUI) displayed by the mobile computing device 105A between a merchant GUI and a customer GUI, and change the inputs sought through the touch or button interface or payment instrument readers, based on whether the housing is in the merchant position or in the customer position.

Figure 1B:
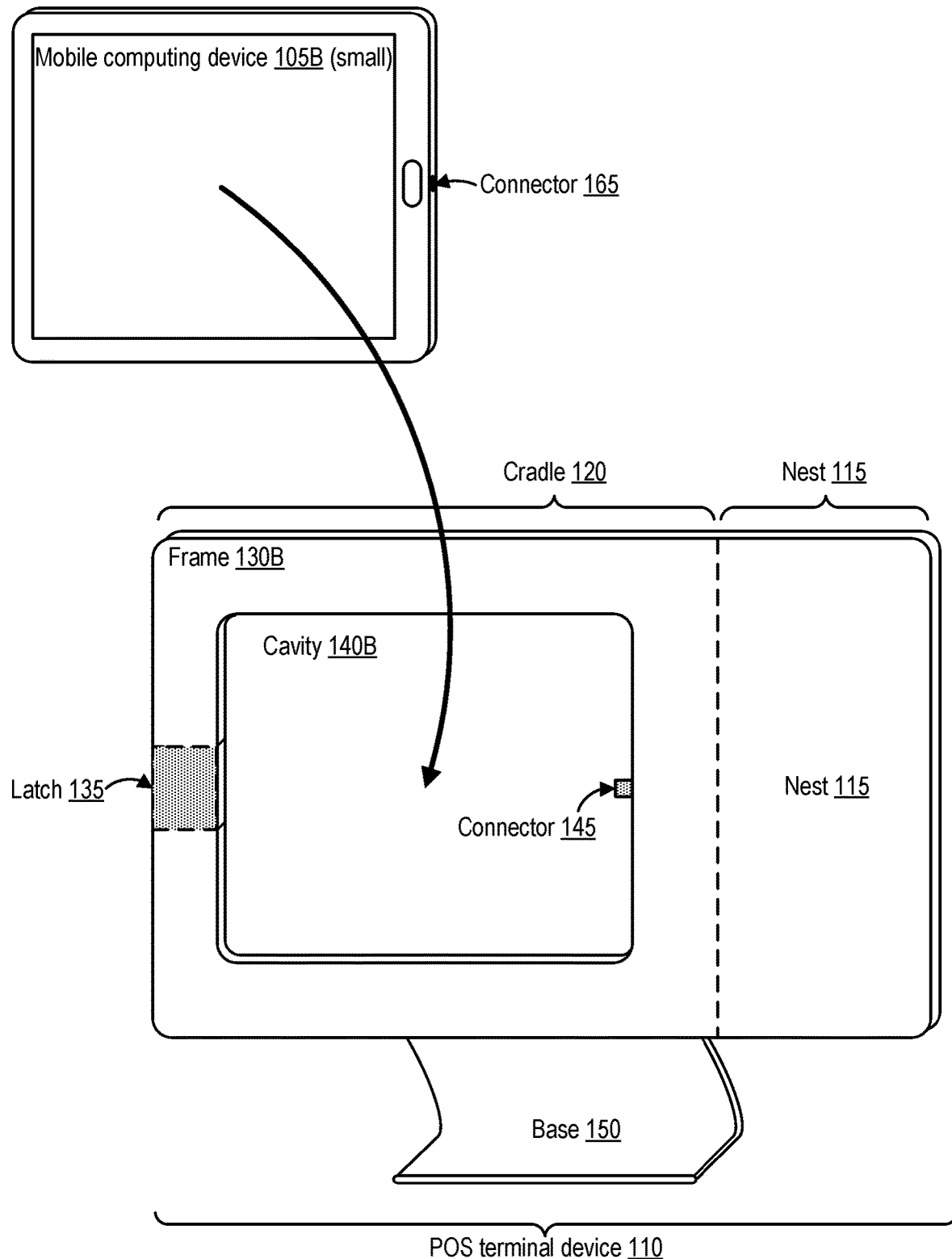
FIG. 1B illustrates a point of sale (POS) terminal device that holds and interfaces with a second mobile computing device that has a second form factor.

In FIG. 1A and FIG. 1B and FIG. 2, the nest 115 is illustrated as positioned to the right of the cradle 120. This provides a good position for a right-handed customer using the POS terminal device 110 to be able to easily move their payment card or payment device into an appropriate slot or other reading area of the nest 115. That is, a right-handed customer can easily swipe or insert a payment card into a slot on the right side of the POS terminal device 110, or tap a payment card or other payment instrument onto a NFC reading area on the right side of the POS terminal device 110. In some cases, the nest 115 may instead be positioned to the left of the cradle 120, or above the cradle 120, or below the cradle 120. In some cases, the POS device 110 may be rotated a about an axis 1435, in the counterclockwise direction 1430 illustrated in FIG. 14 or in an opposite (clockwise) direction, allowing the nest 115 to be reoriented to one of the other sides of the POS terminal device 110. The mobile computing device 105 may include sensors, such as one or more accelerometers, gyroscopes, IMUs, cameras, or combinations thereof, which the mobile computing device 105 may use to determine its orientation and automatically rotate or resize or otherwise adjust any merchant or customer POS GUI displayed by the display screen of the mobile computing device 105 accordingly, as well as any touchscreen touch interface "soft" button positions corresponding to the GUI.

Figure 14:
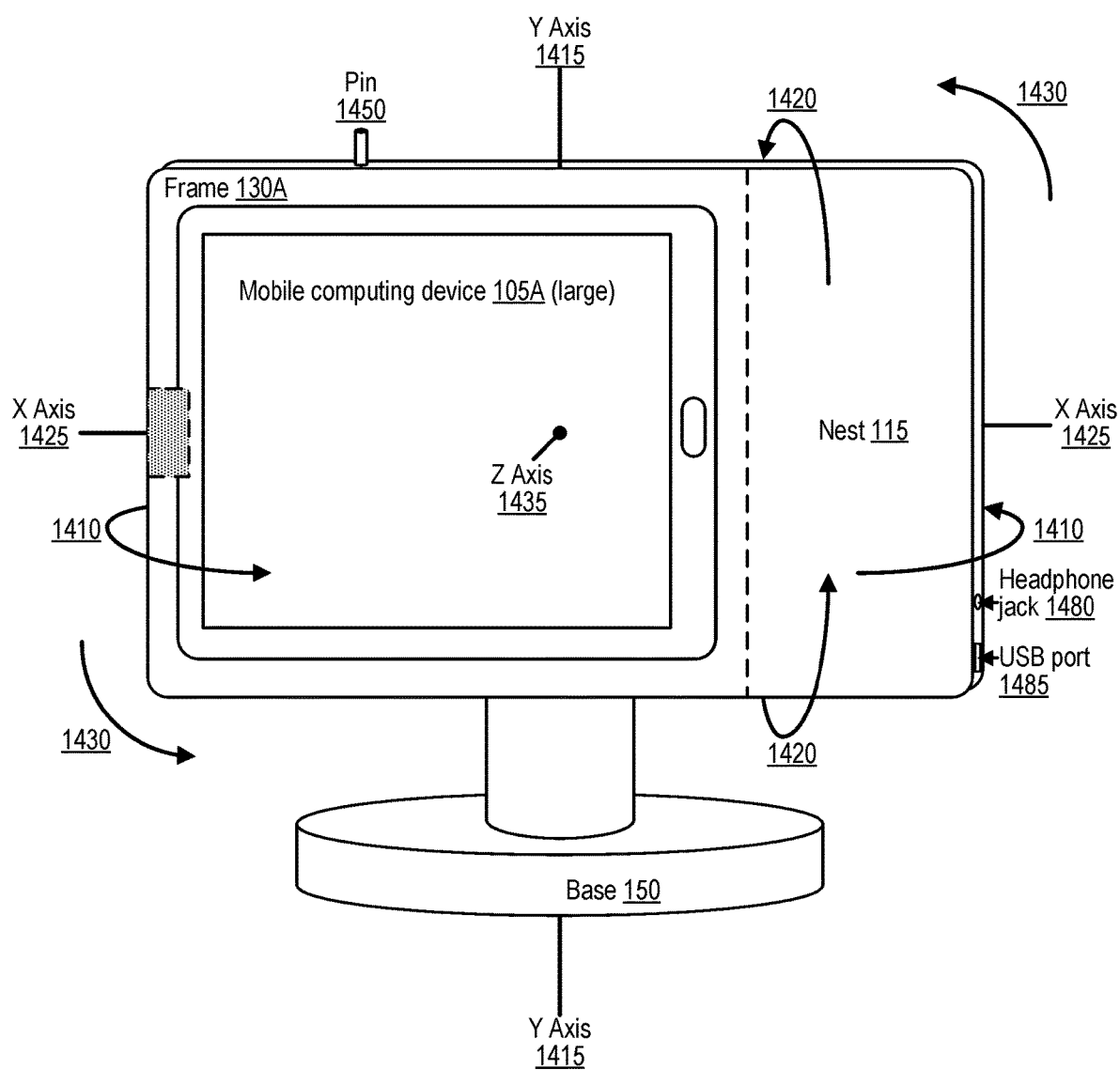
FIG. 14 illustrates the point of sale (POS) terminal rotating about a base along various axes.

The POS terminal device 110 with the frame 130A is also illustrated in FIG. 14, which also shows the mobile computing device 105A secured to the POS terminal device 110 within the cavity 104A by the frame 130A and using the latch 135. In FIG. 14, the connector 165 of the mobile computing device 105A is connected to the connector 145.

Payment instruments, also referred to as payment objects, transaction instruments, or transaction objects, may include payment cards or transaction cards such as credit cards, debit cards, gift cards, or transit cards. Payment instruments may also include payment devices or transaction devices, such as cellular phones, wearable devices, smartphones, tablet devices, laptops, media players, portable gaming consoles, and other computing devices 1900 as discussed with respect to FIG. 19. Payment instruments may store payment instrument information (which may be referred to as payment object information, payment card information, payment device information, payment information, transaction object information, transaction card information, transaction device information, or transaction information), for example encoded along a magnetic stripe on the payment instrument, stored on an integrated circuit (IC) chip such as a Europay-Mastercard-Visa (EMV) chip, or stored in a non-transitory computer-readable storage medium electrically coupled to one or more active and/or passive near field communication (NFC) transceivers of the payment instrument.

FIG. 1B illustrates a point of sale (POS) terminal device that holds and interfaces with a second mobile computing device that has a second form factor.

The POS terminal device 110 of FIG. 1B is the same POS terminal device 110 as illustrated in FIG. 1A, but uses a different frame 130B. That is, the frame 130B of FIG. 1B includes thicker borders along all four of its sides than the frame 130A of FIG. 1A. As a result, the cavity 140B of FIG. 1B is smaller than the cavity 140A of FIG. 1A. The mobile computing device 105B of FIG. 1B is also smaller than the mobile computing device 105A of FIG. 1A, and thus the mobile computing device 105B fits in the smaller cavity 140B.

The mobile computing device 105B of FIG. 1B is illustrated as a smaller tablet device than the mobile computing device 105A of FIG. 1A. In some cases, however, the mobile computing device 105B of FIG. 1B may be a significantly smaller device, such as a smartphone or a media player device.

FIG. 2 illustrates a point of sale (POS) terminal device with interchangeable frames for securing different mobile computing devices with different form factors.

In particular, the point of sale (POS) terminal device 110 includes a housing with the cradle 120 and the nest 115. Both the first frame 130A of FIG. 1A with thin borders and the second frame 130B of FIG. 1B with thick borders are illustrated in FIG. 2. The cradle 120 of FIG. 2 exposes the surface 205, which was only exposed at the back of the cavity 140A in FIG. 1A and at the back of the cavity 140B in FIG. 1B.

The surface 205 of FIG. 2 includes a number of magnets 210 and magnets 215. The magnets 210 are arranged in an exterior rectangle shape (which in some cases may instead be a ring or other shape), while the magnets 215 are arranged in an interior rectangle shape (which in some cases may instead be a ring or other shape) that is inside the exterior shape of the magnets 210. The magnets 210 may be used to secure the frames 130A and 130B to the surface 205 of the cradle 120. For instance, the frames 130A and 130B may also have magnets, ferromagnetic (e.g., metallic) surfaces, or both, along a side of the frames 130A and 130B that mates with the surface 205. The magnets 215 may be used to secure the mobile computing device 105A/105B within the cavity 140A/140B once the frame 130A/130B is already secured to the surface 205. For instance, the mobile computing device 105A/105B may also have magnets, ferromagnetic (e.g., metallic) surfaces, or both, along a side of the mobile computing device 105A/105B that mates with the surface 205 within the cavity 140A/140B.

The magnets 210 and/or magnets 215 which may also be present in FIG. 1A and FIG. 1B even though they are not visible in those figures. The magnets 210 and magnets 215 may be subsurface magnets just underneath the surface 205 (and therefore not visible) or may be visible as illustrated in FIG. 2. The magnets 210 and magnets 215 may be permanent magnets that sustain a permanent magnetic field (e.g., ferromagnets), electromagnets in which a magnetic field can be turned on or off by turning a flow of current on or off, or a combination thereof.

In some cases, the frame 130A/130B and/or the mobile computing device 105A/105B may be removably secured to the surface 205 via one or more of: a latch, a hook, a hook-and-loop fastener, an adhesive, a flexible (e.g. rubber or silicone) seal, a stud and tube coupling system, a screw, a male-female coupling system, or some other coupling system instead or in addition to the magnets 210 and/or magnets 215.

The connector 145 is also illustrated as a long rigid plug extending from the nest 115 into the cradle 120 above the surface 205. In some cases, the connector 145 may simply pass through a portion of a frame 130 through a passage in the frame 130 and partially extend into the cavity 140 (e.g., enough to plug into the connector 165 if it is a port). In other cases, the connector 145 of FIG. 2 may connect to a flexible or rigid extension cable or extension adapter within the frame 130, with the connector 145 of FIG. 1B for example actually being the connector of the extension cable within the frame 130B. In some cases the extension cable of the frame 130 may even include circuitry to change the format of the connector 145, for example from a universal serial bus (USB) standard plug to a proprietary plug such as Apple Lightning cable plug. In some cases, the connector 145 that extends from the nest 115 in FIG. 2 may be a flexible cable rather than a rigid connector, allowing the connector 145 to extend from whichever side of the frame 130 works best (e.g., top, left, bottom, right, or diagonal).

A POS terminal device 110 that is compatible with interchangeable frames 130 provides considerable benefit by giving merchants the flexibility to use the POS terminal device 110 with older models of mobile computing devices 105, newer models of mobile computing devices 105, and to even continue using the POS terminal device 110 with future models of mobile computing devices 105 that are only released after the merchant already has the POS terminal device 110. Another benefit is that certain certifying bodies may be able to certify the POS terminal device 110 independently of its various frames 130, since the frames 130 in most cases serve to secure the mobile computing device 105 in place, and do not store or convey sensitive data such as encryption keys or unencrypted payment instrument information. Thus, recertification is not necessary even when new frames 130 are developed to support shapes, sizes, and form factors of future versions of mobile computing devices 105.

Figure 3:
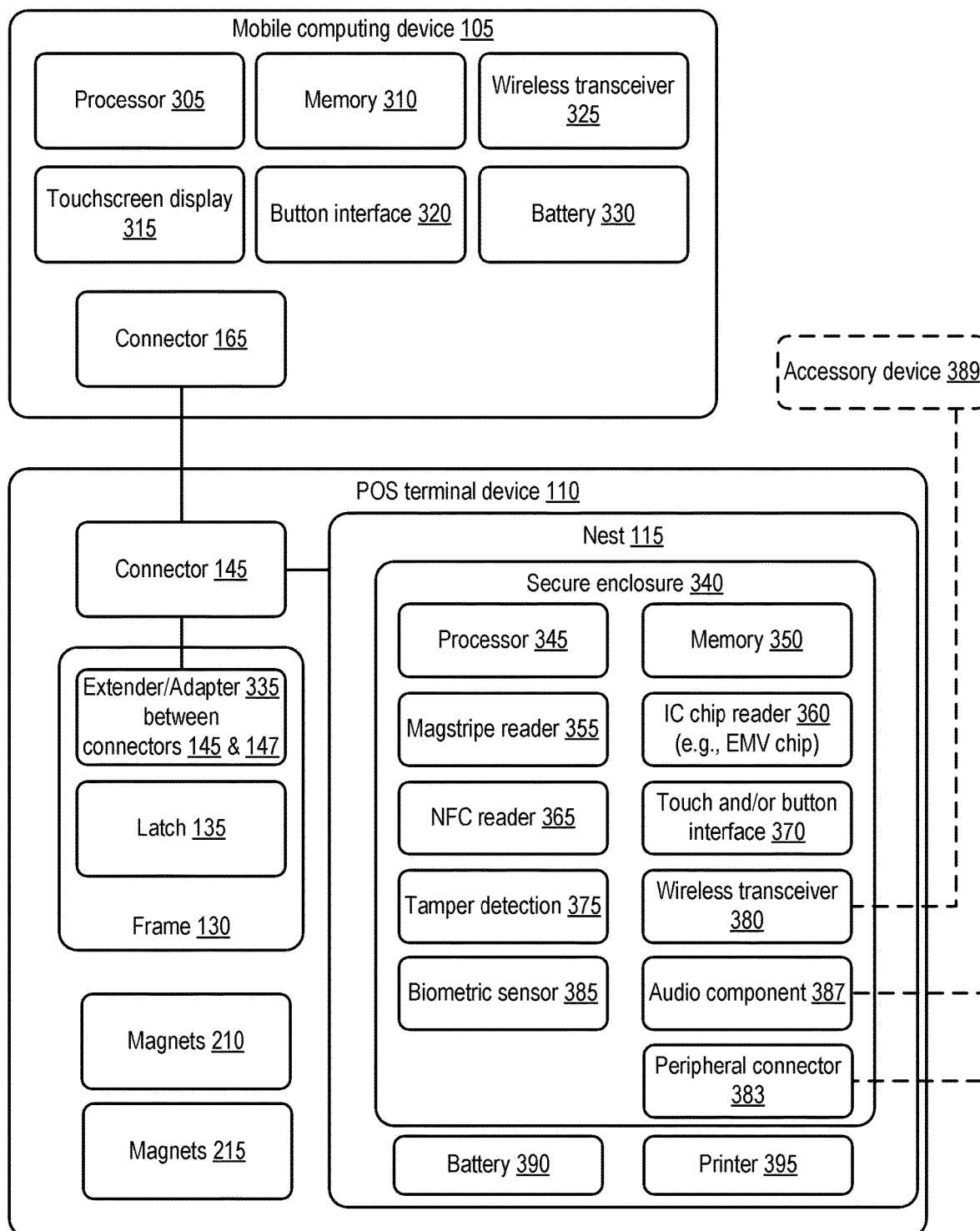
FIG. 3 illustrates a system architecture including a merchant point of sale (POS) terminal device and a mobile computing device.

FIG. 3 illustrates a system architecture including a merchant point of sale (POS) terminal device and a mobile computing device.

The system architecture 300 includes the mobile computing device 105 and the POS terminal device 110. The mobile computing device 105 refers to a mobile computing device 105 of any form factor, such as the large mobile computing device 105A of FIG. 1A or the small mobile computing device 105B of FIG. 1B.

The mobile computing device 105 includes a processor 305, which may be any type of processor 1910 discussed with respect to FIG. 19 or any type of processor otherwise discussed herein. The mobile computing device 105 includes a memory 310, which may be any type of memory 1920 discussed with respect to FIG. 19, any type of mass storage 1930 discussed with respect to FIG. 19, any type of portable storage 1940 discussed with respect to FIG. 19, any type of memory or storage otherwise discussed herein, or some combination thereof.

The mobile computing device 105 may include a touchscreen display 315, which may be any type of display screen or display system 1970 discussed with respect to FIG. 19 or otherwise discussed herein, and which may optionally include a touch-sensitive surface touchscreen interface such as a capacitive touch-sensitive interface or a resistive touch-sensitive interface. The mobile computing device 105 may include a button interface 320, which may include, for example a keyboard, keypad, mouse, selection buttons aligned with GUI elements displayed on the display 315, any other input device 1960 discussed with respect to FIG. 19, or some combination thereof.

The mobile computing device 105 may include one or more wireless transceivers 325, which may include one or more 802.11 wi-fi transceivers, wireless local area network (WLAN) transceivers, 3G/4G/LTE/5G cellular network transceivers, Bluetooth transceivers, NFC transceivers, RFID transceivers, any type of wireless transceivers discussed with respect to the input devices 1960 of FIG. 19, any type of wireless transceivers discussed with respect to the output devices 1950 of FIG. 19, any other type of wireless transceivers discussed herein, or some combination thereof. The mobile computing device 105 may include one or more batteries 330.

The mobile computing device 105 may include at least one connector 165 that can connect with a connector 145 of the POS terminal device 110. Likewise, the POS terminal device 110 may include the connector 145, which connects to the connector 165 of the mobile computing deice 105. The connectors 145 and 165 may be wired connectors that form an electrical connections when joined together. For example, the connector 165 may be a female port while the connector 145 is a male plug. Alternately, the connector 165 may be a male plug while the connector 145 is a female port. Alternately, both connectors 145 and 165 may be female, or both may be male, and they may be connected together by a female-to-female or male-to-male adapter or cable, which may in some cases be located in the frame 130 and may be referred to as the extender/adapter 335. The extender/adapter 335 of the frame 130 may also change connection types or formats, for example by including an adapter from a Universal Serial Bus (USB) standard port or plug (such as USB-C) to another type of port or plug such as an Apple Lightning port or plug, or vice versa. The extender/adapter 335 of the frame 130 may in some cases include some components that modify a signal being conveyed between the connector 145 and the connector 165 (in either direction), such as an analog to digital converter (ADC), a digital to analog converter (DAC), an amplifier, a high-pass filter, a low-pass filter, a band-pass filter, or some combination thereof. The extender/adapter 335 of the frame 130 may in some cases include some components, such as a memory and processor (not pictured), that may be used to modify a format of data being conveyed between the connector 145 and the connector 165 (in either direction), for example by changing a file format and/or adding an extra layer of encryption based on an encryption key stored in a memory of the frame 130.

In some cases, the connectors 145 and 165 may be, or may include, one or more wireless receivers, transmitters, or transceivers that may connect wirelessly to one another rather than through electrical contact. In such cases, the connectors 145 and 165 may be or may include 802.11 wi-fi wireless receivers/transmitters/transceivers, wireless local area network (WLAN) receivers/transmitters/transceivers, Bluetooth receivers/transmitters/transceivers, personal area network (PAN) receivers/transmitters/transceivers, 3G/4G/LTE/5G cellular network receivers/transmitters/transceivers, NFC receivers/transmitters/transceivers, RFID receivers/transmitters/transceivers, any type of wireless receivers/transmitters/transceivers discussed with respect to the input devices 1960 of FIG. 19, any type of wireless receivers/transmitters/transceivers discussed with respect to the output devices 1950 of FIG. 19, any other type of wireless receivers/transmitters/transceivers discussed herein, or some combination thereof. Thus, data may be conveyed between the mobile computing device 105 and the POS terminal device 110 (e.g., the nest 115) wirelessly via the wireless receivers, transmitters, and/or transceivers of the connectors 145 and 165. The connectors 145 and 165 may also include wireless charging elements, such as inductive coils, in order to wirelessly provide power from the POS terminal device 110 (e.g., from the nest 115) to the mobile device 105 and/or to wirelessly provide power from the mobile device 105 to the POS terminal device 110 (e.g., to the nest 115). Thus, power may be conveyed between the mobile computing device 105 and the POS terminal device 110 (e.g., the nest 115) wirelessly via the wireless charging elements of the connectors 145 and 165.

The frame 130 refers to a frame 130 of any form factor, such as the frame 130A with thin borders (to accommodate a large mobile computing device 105A in large cavity 140A) of FIG. 1A or the frame 130B with thick borders (to accommodate a small mobile computing device 105B in small cavity 140B) of FIG. 1B. As noted above, the frame 130 may include an extender or adapter 335 for bridging the connector 145 to the connector 165. In some cases, the extender/adapter 335 may be used to modify which side of the cradle 120 the mobile computing device 105's connector 165 connects to the connector 145 through. For example, while FIG. 1A, FIG. 1B, and FIG. 2 all show the connector 145 on the right-hand side extending from the right border of the cavity 140 and from the nest 115, the extender/adapter 335 could be used so that a connector instead extends from the bottom border of the cavity 140, from the left border of the cavity 140, from the top border of the cavity 140, or from a diagonal corner of the cavity.

The frame 130 may include a latch 135, which may be used to secure the mobile computing device 105 to the POS terminal device 110, in particular within the cavity 140 that the frame 130 borders. Examples of the latch 135 are illustrated in, and discussed with respect to, at least FIGS. 1A, 1B, 2, 4A, 4B, 4C, 4D, 4E, and 14.

The POS terminal device 110 may include the magnets 210 and magnets 215 illustrated in FIG. 2. In some cases, magnets 215 for securing the mobile computing device 105 within the cavity 140 may alternately or additionally be located at one or more of the borders of the frame 130. Alternately or additionally, the POS terminal device 110 may include other physical coupling mechanisms that couple the frame 130 to the surface 205 of the cradle 120 of the POS terminal device 110 like the magnets 210 do and/or that couple the mobile computing device 105 to the surface 205 of the cradle 120 of the POS terminal device 110 and/or to the frame 130 like the magnets 215 do.

The POS terminal device 110 may include the nest 115. The nest 115 may include a secure enclosure 340. The secure enclosure 340 may be used to house components that might read, store, convey, or manipulate sensitive information, such as encryption keys, payment instrument information, customer identifying information, personal identification numbers (PIN) or codes, customer signatures, merchant identifying information, or other sensitive information.

The secure enclosure 340 is secure in that it includes tamper detection circuitry 375 that can detect attempts to damage, drill into, modify, spill conductive liquid into/onto, or remove the secure enclosure 340 or any component within the secure enclosure 340. The tamper detection circuitry 375 includes one or more voltage sensors positioned at various points along conductive circuitry that, if untampered with, should conduct a known voltage, but if tampered with, are expected to conduct no current at all (e.g., due to a broken/open circuit) or to conduct a different voltage (e.g., due to a short circuit or other unwanted connection). If a tamper attempt is detected based on detection of one or more a voltage changes greater than a predetermined tolerance in one or more voltages by the one or more voltage sensors of the tamper detection circuitry 375, then the POS terminal device 110 may be at least partially disabled or deactivated, and data stored in its memory 350 may optionally be modified, erased, deleted, destroyed, and/or overwritten to prevent a malicious party from gaining access to sensitive information. Examples of the secure enclosure 340 and tamper detection circuitry 375 are illustrated and discussed further herein as the secure enclosure 705 of FIGS. 7A and 7B, the secure enclosure 805 of FIGS. 8A and 8B, the secure enclosure 1015 of FIG. 10, and the secure enclosure 1895 of FIG. 18.

The secure enclosure 340 of the nest 115 may include a magnetic stripe reader 355, which reads payment instrument information from a magnetic stripe of a payment instrument, such as a payment card, in response to receipt of the magnetic stripe through a slot of the nest 115. The secure enclosure 340 of the nest 115 may include a IC chip reader 360 such as an EMV chip reader, which reads payment instrument information from an IC chip of a payment instrument, such as a payment card, in response to receipt of the IC chip into a slot of the nest 115. The secure enclosure 340 of the nest 115 may include a NFC reader 365, which reads payment instrument information wirelessly from a wireless signal received from an NFC transmitter or NFC transceiver of a payment instrument. The NFC transmitter or NFC transceiver of the payment instrument may be an active NFC transmitter/transceiver or passive NFC transmitter/transceiver.

The secure enclosure 340 of the nest 115 may include one or more processors 345, each of which may be any type of processor 1910 discussed with respect to FIG. 19 or any type of processor otherwise discussed herein. The secure enclosure 340 of the nest 115 includes one or more memory components 350, each of which may be any type of memory 1920 discussed with respect to FIG. 19, any type of mass storage 1930 discussed with respect to FIG. 19, any type of portable storage 1940 discussed with respect to FIG. 19, any type of memory or storage otherwise discussed herein, or some combination thereof. While the processors 345 and memory 350 are illustrated inside the secure enclosure 340 of the nest 115 in FIG. 3, in some cases the nest 115 may include one or more processors 345 and memory components 350 inside the secure enclosure as well as one or more processors 345 and memory components 350 outside of the secure enclosure. In such cases, the processors 345 and memory 350 within the secure enclosure 340 can handle tasks concerning tamper detection or sensitive information, such as tamper detection, storage of encryption keys, encryption of payment instrument information, receipt of signatures or PIN codes or biometric data or other sensitive information via interfaces 370 or sensors 385, output of sensitive data through audio components 387, and the like. The processors 345 and memory 350 outside of the secure enclosure 340 can handle tasks not dealing with unencrypted sensitive information, such as receipt generation, activation of electromagnets 210/215, managing the connection between the connector 145 and the connector 165, and the like.

In some cases, the processor 345 may execute instructions stored in the memory 350 to encrypt the payment instrument information once it is read by one or more of the reader(s) 355/360/365 but before the payment instrument information is sent to the mobile communication device 105 and/or to the payment processing server. That is, once encrypted, the payment instrument information may be sent to the payment processing server via the wireless transceiver 380 of the nest 115, or the payment instrument information may be sent to the mobile computing device 105 over the connectors 145 and 165, and the mobile computing device 105 may then send the payment instrument information to the payment processing server via the wireless transceiver 325 of the mobile computing device 105. In some cases, the one or more wireless transceivers 325 or 380 may receive a confirmation from the payment processing server once the payment transaction is processed, for instance once the funds (in the payment amount) are transferred from the account associated with the customer to the account associated with the merchant. If the confirmation is received at the one or more wireless transceivers 325, the mobile computing device 105 may also notify the POS terminal device 110 that the confirmation has been received, for example by forwarding the confirmation to the POS terminal device 110.

The secure enclosure 340 of the nest 115 may include a touch and/or button interface 370, which may include, for example, a touchscreen, a touchpad, a keyboard, keypad, mouse, selection buttons aligned with GUI elements displayed on the display 315, any other input device 1960 discussed with respect to FIG. 19, or some combination thereof. The touch and/or button interface 370 of the nest 115 may be used to input sensitive information such as PIN codes, customer identifying information, merchant identifying information, or customer signatures. The secure enclosure 340 of the nest 115 may include one or more biometric sensors 385, which may include fingerprint scanners, iris scanners, face scanners, palmprint scanners, microphones with voice recognition, or combination thereof. The biometric sensors 385 may be used to authenticate customer identity, for example in place of a signature or PIN, and/or may be used to authenticate merchant identity, for example to authorize a purchase or discount or return.

The secure enclosure 340 of the nest 115 may include one or more wireless transceivers 380, which may include one or more 802.11 wi-fi transceivers, wireless local area network (WLAN) transceivers, 3G/4G/LTE/5G cellular network transceivers, Bluetooth transceivers, NFC transceivers, RFID transceivers, any type of wireless transceivers discussed with respect to the input devices 1960 of FIG. 19, any type of wireless transceivers discussed with respect to the output devices 1950 of FIG. 19, any other type of wireless transceivers discussed herein, or some combination thereof. In some cases, the one or more wireless transceivers 380 may be used to transmit the payment instrument information to the payment processing server, optionally along with a payment amount, customer identifying information allowing the payment processing server to identify the account associated with the customer, and merchant identifying information allowing the payment processing server to identify the account associated with the merchant. In some cases, the one or more wireless transceivers 380 may then receive a confirmation from the payment processing server once the payment transaction is processed, for instance once the funds (in the payment amount) are transferred from the account associated with the customer to the account associated with the merchant.

The nest 115 may also include one or more batteries 390 that may supply power to the other components of the POS terminal device 110, and optionally to the mobile computing device 105 through the connectors 145 and 165. Alternately or additionally, the mobile computing device 105 may supply power to the one or more batteries 390 and/or to the other components of the POS terminal device 110 through the connectors 165 and 145. In some cases, the nest 115 may have no battery 390, and its components may be powered exclusively by the mobile computing device 105 through the connectors 165 and 145. For example, the mobile computing device 105 may supply power to the POS terminal device 110 when the payment instrument readers should be activated. In some cases, the nest 115 may use a battery 390 to keep the tamper detection circuitry 375 active, while the payment instrument readers are only activated when the mobile computing device 105 is connected and/or supplying power via connectors 145/165. In some cases, the nest 115 may use a battery 390 to stabilize supply of power to the payment instrument readers and prevent issues related to blackouts or brownouts. While the one or more batteries 390 are illustrated outside the secure enclosure 340 within the nest 115 in FIG. 3, in some cases at least one battery 390 of the one or more batteries 390 it may be located within the secure enclosure 340, for example to prevent a malicious party from disconnecting the tamper detection circuitry 375 from power as a means of tampering.

The nest 115 may also include one or more audio components 387, such as a 3.5 mm headphone jack, a 2.5 mm headphone jack, a USB audio connector, a Apple Lightning audio connector, a Bluetooth® wireless audio connector, another type of wired and/or wireless audio connector, a speaker, or some combination thereof. The audio components 387 may be used to read information out loud through a speaker of the audio components 387 or through headphones connected in a wired and/or wireless fashion to the audio components 387 to customers or merchants with disabilities such as blindness or other visual impairments. The information read aloud may include, for example, instructions for interacting with a user interface of the POS terminal device 110 for the customer portion or a merchant portion of the transaction. In some cases, at least some of the circuitry associated with the one or more audio components 387 may be located within the secure enclosure 340 because some of the information that is read to customers through the audio components 387 may be sensitive information, such as a payment card number, customer identifying information, a PIN code, or the like. An optional accessory device 389 is illustrated as being connected to the audio components 387 in FIG. 3. The accessory device 389 may include a set of headphones as discussed above.

The accessory device 389 may alternately or additionally include a peripheral device other than a set of headphones, such as a card reader or other type of transaction object reader, a barcode scanner, a weight scale, a cash drawer, a keyboard, a keypad, a mouse, a printer, or some combination thereof. While the accessory device 389 may be connected to the POS terminal device 110 by being connected to the audio component 387, the accessory device 389 may alternately or additionally be connected to the POS terminal device 110 through a peripheral connector 383 separate from the audio component 387, and/or a wireless transceiver 380 separate from the audio component 387. The peripheral connector 383 may include one or more ports, one or more plugs, one or more wired or wireless receivers, one or more wired or wireless transmitters, one or more wired or wireless transceivers, or some combination thereof, such as in a hub. The peripheral connector 383 may include one or more of any wired or wireless connector of any type discussed with respect to the output device 1950, input devices 1960, or otherwise mentioned herein, which the accessory device 389 may connect to. For example, the peripheral connector 383 may include one or more USB ports, which the accessory device 389 may connect to via a USB plug or USB cable. While only one accessory device 389 is illustrated in FIG. 3, multiple accessory devices 389 may be connected to the POS terminal device 110—in some cases, one or more accessory devices 389 may be connected to the wireless transceiver 380 of the POS terminal device 110, one or more accessory devices 389 may be connected to the audio component 387 of the POS terminal device 110, and/or one or more accessory devices 389 may be connected to the peripheral connector 383 of the POS terminal device 110. While the audio component 387, peripheral connector 383, and wireless transceiver 380 are all illustrated as being positioned within the secure enclosure 340, in some cases, one or more of these may be outside of the secure enclosure 340. In fact, in some cases, other components illustrated within the secure enclosure 340 may be outside of the secure enclosure 340, and/or components illustrated as outside of the secure enclosure 340 may be within the secure enclosure 340.

The nest 115 may also include a printer 395, which may be used to print a receipt during the transaction or after the transaction has been processed. The receipt may identify prices for each individual item or service purchased by the customer from the merchant, subtotal, the total, any taxes and/or fees and/or tips and/or gratuities, any coupons or discounts or other promotions applied, and the like. The receipt may be generated by the processor(s) 305 of the mobile computing device 105, the processor(s) 345 of the nest 115 of the POS terminal device 110, or some combination thereof. The receipt may in some cases be emailed, texted, and/or sent via an electronic messaging service to an account and/or device associated with the customer instead of or in addition to being sent to the printer 395 to be printed.

Figure 4A:
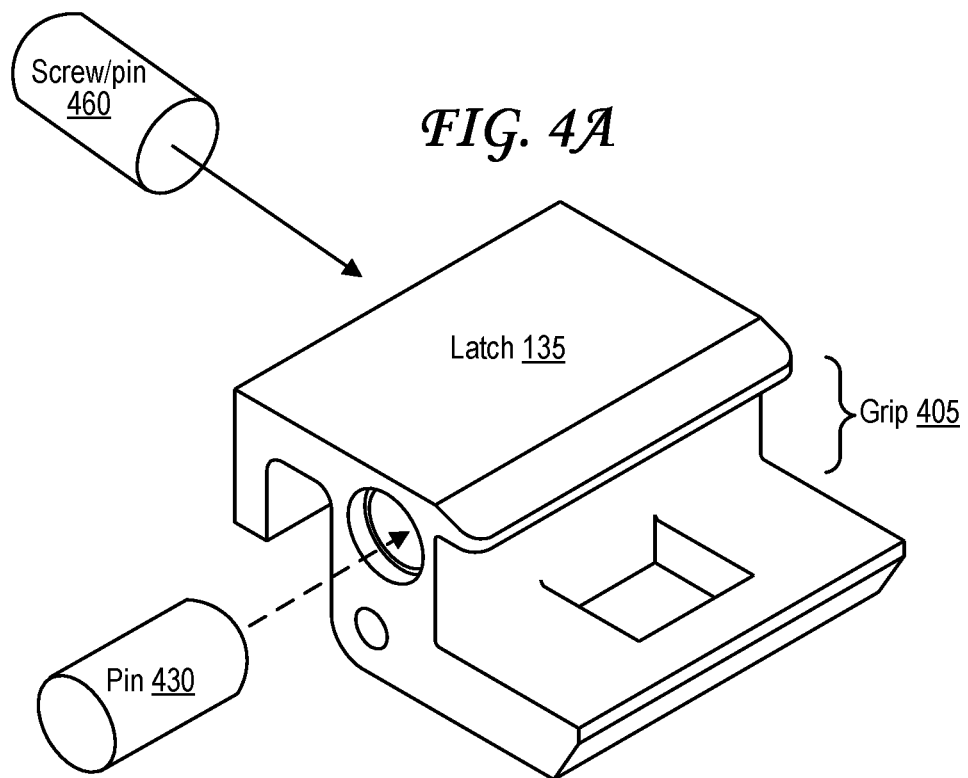
FIG. 4A illustrates a latch of a frame of a point of sale (POS) terminal device from a perspective view.

FIG. 4A illustrates a latch of a frame of a point of sale (POS) terminal device from a perspective view.

Figure 4B:
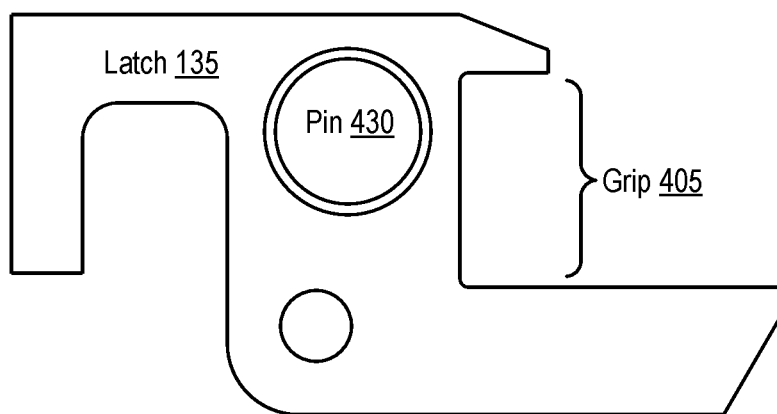
FIG. 4B illustrates the latch of the frame of point of sale (POS) terminal device from a side view.
Figure 4C:
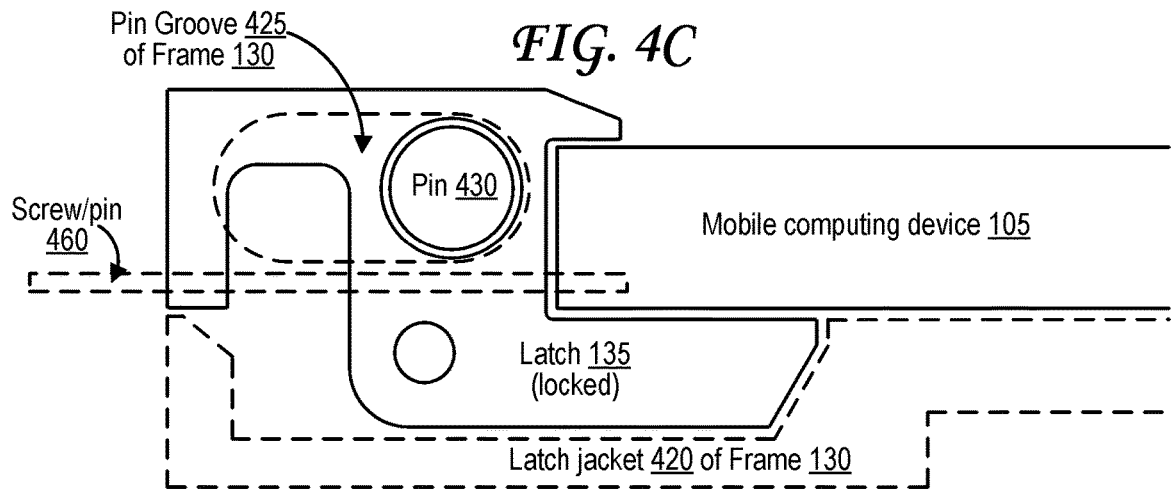
FIG. 4C illustrates the latch of the frame of the point of sale (POS) terminal device in a locked position securing a mobile computing device from a side view.
Figure 4D:
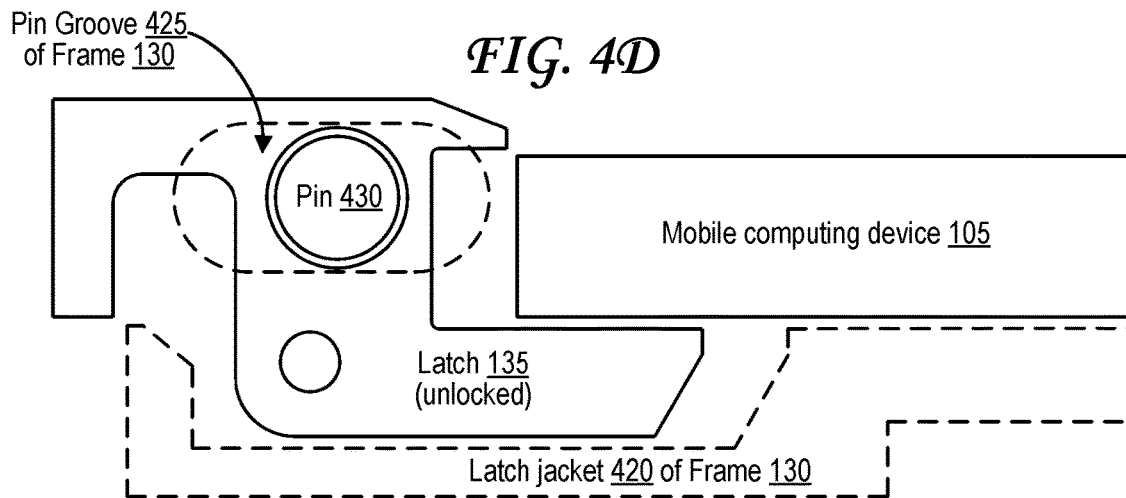
FIG. 4D illustrates the latch of the frame of the point of sale (POS) terminal device in an unlocked position cradling a mobile computing device from a side view.
Figure 4E:
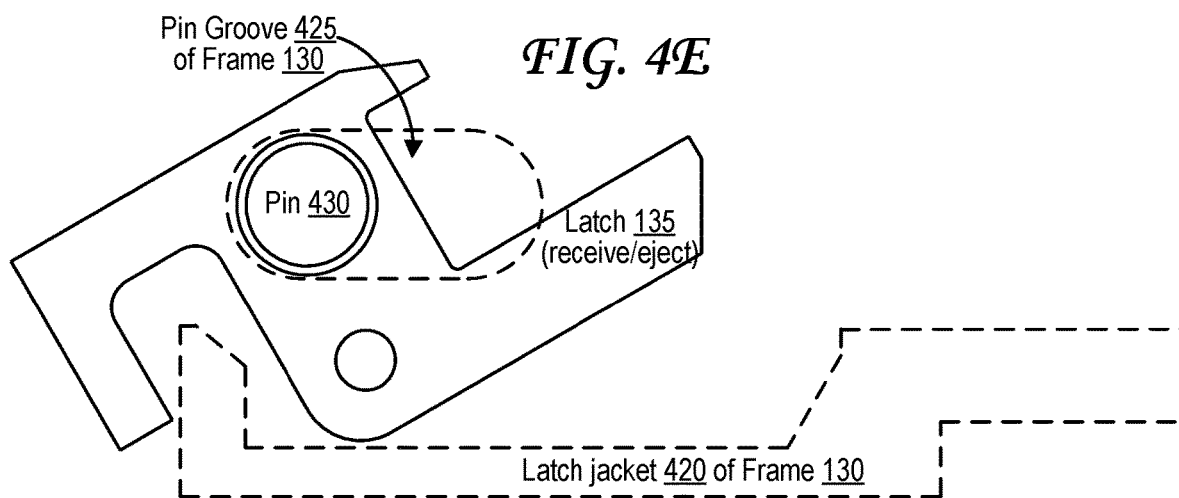
FIG. 4E illustrates the latch of the frame of the point of sale (POS) terminal device in a receive/eject position from a side view.

The latch 135 illustrated in FIG. 4A includes two circular holes on either side, into which cylindrical pins 430 may be inserted that enable movement of the latch 135 as illustrated in FIGS. 4C, 4D, and 4E. The pins may include a ball spring plunger, like a pogo pin. The pins 430 may also be inserted into walls of the frame 130 that surround the latch 135, for example into pin grooves 425 within the walls of the frame 130 as illustrated in FIGS. 4C, 4D, and 4E. Two smaller circular holes are also illustrated on either side of the latch 135—these may interface with convex bumps in the walls of the frame that fit into the holes and may encourage the latches to remain in certain positions, such as the locked position of FIG. 4C, the unlocked position of FIG. 4D, or the receive/eject position of FIG. 4E.

The latch 135 may include a grip portion 405 configured to hold a portion of a mobile computing device 105. The grip 405 may include two parallel surfaces (a "top" and "bottom" surface in FIG. 4A) between which the thickness of the mobile computing device 105 can fit, and a wall surface (the "left" surface in FIG. 4A) perpendicular to the two parallel surfaces against which the mobile computing device 105 can abut. The latch 135 may be customized for a particular mobile device 105 so that the thickness that the grip 405— that is, the distance between the parallel surfaces of the grip 405, or the length of the perpendicular surface of the grip 405—corresponds to the thickness of the mobile computing device 105, the thickness of the mobile computing device 105 determined either with or without a case depending on how the mobile computing device 105 is intended to be used by the merchant.

In some cases, a screw or pin 460 may also be inserted into the latch 136 where illustrated by the solid arrow in FIG. 4A. This screw may help secure the latch 136 in a particular position, such as the locked position of FIG. 4C. The screw/pin 460 may also function line the pin 1450 of FIG. 14 in that the screw/pin 460 may be inserted into a port of the mobile computing device 105, or other recess in a side surface of the mobile computing device 105, to help secure the mobile computing device 105 in place in the cavity 140.

FIG. 4B illustrates the latch of the frame of point of sale (POS) terminal device from a side view.

From the side view of FIG. 4B, the pin 430 is visible having been inserted into the circular hole in the latch 135 as shown in FIG. 4A and partially extending from the side of the latch 135. The grip portion 405 is again visible in FIG. 4B. The smaller circular holes in the side of the latch 135 are also visible in FIG. 4B below the pin 430.

FIG. 4C illustrates the latch of the frame of the point of sale (POS) terminal device in a locked position securing a mobile computing device from a side view.

The pin 430 of the latch 135 is inserted into a pin groove 425 within a wall of the frame 130 that abuts the side of the latch 135. The pin groove 425 is wide enough (in the vertical direction in FIGS. 4C, 4D, and 4E) to fit the diameter of the pin 430 and therefore allows the latch 135 to rotate about the pin 430 as seen in the receive/eject position of the latch 135 in FIG. 4E. Because the pin groove 425 is also longer (in the horizontal direction in FIGS. 4C, 4D, and 4E) than the diameter of the pin 430, the pin 430 is able to slide laterally along the length of the pin groove 425, enabling the entire latch 135 to slide laterally within a latch jacket 420 of the frame 130. The pin 430 of the latch 135 is positioned laterally as far forward (toward the mobile computing device 105) within the pin groove 420 as possible when the latch 135 is in the locked position illustrated in FIG. 4C.

The latch jacket 420 is a structure that is part of the frame 430 that forms a "base" or "platform" on which the bottom of the latch 135 may rest and along which the bottom of the latch 135 may slide during translational movements or rotations, and in some cases limits the range of movement that the latch 135 is capable of. For example, the structure of the latch jacket 420 allows the latch 135 to slide laterally (left and right in FIGS. 4C, 4D, and 4E) translationally within a defined movement range as visible in FIGS. 4C, 4D, and 4E, and allows the latch 135 to rotate within a defined range of rotation and only when the latch 135 is positioned laterally at certain positions as visible in FIG. 4C. While the latch jacket 420 is referred to as part of the frame 430, it may in some cases actually be part of the surface 205 of the cradle 120 instead. In some cases, the latch jacket 420 may be comprised of both a portion of the frame 430 and a portion of the surface 205.

The grip 405 of the latch 135 is shown holding a mobile computing device 105 by the thickness of the mobile computing device 105. Because of this, the mobile computing device 105 is secured to the cavity 140 (surface 205) and frame 130 while the latch 135 is in the locked position as in FIG. 4C. The mobile computing device 105 cannot be easily separated from the cavity 140 (surface 205) and frame 130 while the latch 135 is in the locked position as in FIG. 4C. In some cases, the connectors 165 and 145 are connected at another side of the mobile computing device 105 than the side gripped and secured by the latch 135. The connection between the connectors 145 and 165 may additionally secure that side of the mobile computing device 105 to the frame 130 (or to the connector 145). In some cases, the connectors 145 and 165 may be at the same side of the mobile computing device 105 that is gripped and secured by the latch 135, and in some cases the connector 145 may even pass through a portion of the latch 135, such as through the rectangular hole at the bottom of the latch 135 that is visible in FIG. 4A.

The screw/pin 460 is also illustrated in FIG. 4C as a skinny rod that is inserted into the latch 135 while the latch 135 is in the locked position, and that passes into a port or recess within the mobile computing device 105 as well. The screw/pin 460 may prevent rotational and/or lateral movement of the latch 135 while it is inserted or screwed in. In some cases, the screw/pin 460 may also pass through at least a portion of the latch jacket 420 of the frame 130 and/or cradle 120 when it is inserted.

FIG. 4D illustrates the latch of the frame of the point of sale (POS) terminal device in an unlocked position cradling a mobile computing device from a side view.

The pin 430 of the latch 135 is positioned laterally approximately midway within the pin groove 420 when the latch 135 is in the unlocked position illustrated in FIG. 4D. In the unlocked position, the latch 135 as a whole is moved laterally away from the mobile computing device 105 relative to the locked position, and no longer grips the mobile computing device 105. Thus, the mobile computing device 105 is not as strongly secured to the cavity 140 (surface 205) and frame 130 when the latch 135 is in the unlocked position. However, in some cases it may still be difficult to insert the mobile computing device 105 into the cavity 140 when the latch 135 is in the unlocked position, as there still might not be much space to connect the connectors 145 and 165. Likewise, in some cases it may still be difficult to eject the mobile computing device 105 from the cavity 140 when the latch 135 is in the unlocked position, as there still might not be much space to disconnect the connectors 145 and 165.

FIG. 4E illustrates the latch of the frame of the point of sale (POS) terminal device in a receive/eject position from a side view.

The pin 430 of the latch 135 is positioned laterally as far backward (away from the mobile computing device 105) within the pin groove 420 as possible when the latch 135 is in the receive/eject position illustrated in FIG. 4E. The latch 135 is also rotated about the pin 430 in the receive/eject position illustrated in FIG. 4E, from approximately zero degrees to approximately 45 degrees. The combination of translational movement away from the mobile computing device 105 and rotation away from the surface 205 can aid a user in inserting the mobile computing device 105 into the cavity 140 and/or can aid the user in ejecting the mobile computing device 105 from the cavity 140.

In some POS terminal devices 110, the latch 135 might not rotate at all, or may only rotate without any translational movement. In some POS terminal devices 110, the latch 135 might have a larger or smaller defined range of rotation, for example from zero degrees to 10 degrees, 20, degrees, 30 degrees, 40 degrees, 50 degrees, 60 degrees, 70 degrees, 80 degrees, 90 degrees, 100 degrees, 110 degrees, 120 degrees, 130 degrees, 140 degrees, 150 degrees, 160 degrees, 170 degrees, 180 degrees, 225 degrees, 270 degrees, 315 degrees, or 360 degrees. While the latch 135 within the latch jacket 420 illustrated in FIGS. 4C, 4D, and 4E can only rotate when the latch 135 is in or near the receive/eject position due to a barrier near the rear of the jacket 420, some latch jackets 420 may lack such a barrier and allow rotation at any lateral position, or may limit rotation to other lateral positions than the receive/eject positon.

FIG. 5 is a flow diagram illustrating operations of a point of sale (POS) terminal device with a removable frame.

The operations 500 of FIG. 5 are performed by the POS terminal device 110. At step 505, the POS terminal device 110 secures a frame 130 to a housing of the POS terminal device 110. The frame 130 may be secured to the surface 205 of the cradle 120 portion of the housing of the POS terminal device 130, for example, as shown in FIGS. 1A and 1B. The frame 130 may be secured to the housing of the POS terminal device 130 using magnets 210 as illustrated in and discussed with respect to FIG. 2. The frame 130 may alternately or additionally be secured to the housing of the POS terminal device 130 using latches, hooks, adhesives, screws, and/or any other mechanism discussed with respect to FIGS. 1A, 1B, and 2. If the magnets 210 include electromagnets, then the POS terminal device 110 may secure the frame 130 to the housing of the POS terminal device 110 in part by activating the electromagnets of the magnets 210.

At step 510, the POS terminal device 110 secures initiates an electrical connection between a mobile computing device 105 and the POS terminal device 110 in response to electrical contact between a connector 165 of the mobile computing device 105 and a connector 145 of the POS terminal device 110. In some cases, the connectors 145 and 165 may be USB micro connectors, USB-C connectors, or Apple Lightning connectors. The electrical connection between the connectors 145 and 165 may convey data, power or both. The electrical connection between the connectors 145 and 165 may convey any combination of data and/or power from the mobile computing device 105 to the POS terminal device 110, from the POS terminal device 110 to the mobile computing device 105, or both.

At step 515, the POS terminal device 110 secures the mobile computing device 105 to the POS terminal device 110 (optionally the housing of the POS terminal device 110) using at least the frame 130. The POS terminal device 110 may secure the mobile computing device 105 to the POS terminal device 110 via the frame 130 simply based on at least some of the borders of the frame 130 being snug against the mobile computing device 105 when it is inserted into the cavity 140. The POS terminal device 110 may secure the mobile computing device 105 to the POS terminal device 110 via a latch 135, for example as show in FIGS. 1A, 1B, 4A, 4B, 4C, 4D, 4E, and 14. The POS terminal device 110 may secure the mobile computing device 105 to the POS terminal device 110 via one or more magnets 215 as illustrated in FIG. 2. The mobile computing device 105 may alternately or additionally be secured to the POS terminal device 130 using latches, hooks, adhesives, screws, and/or any other mechanism discussed with respect to FIGS. 1A, 1B, and 2. If the magnets 215 include electromagnets, then the POS terminal device 110 may secure the mobile computing device 105 to the POS terminal device 110 in part by activating the electromagnets of the magnets 215.

At step 520, the POS terminal device 110 reads payment instrument information from a payment instrument via a reader of the POS terminal device. The reader may be any type of payment instrument reader discussed herein, such as a magnetic stripe reader, an IC chip reader, or an NFC reader. The payment instrument reader may read the payment instrument information from the payment instrument in response to receipt of the payment instrument in a card slot that includes a card reader, NFC reading area that is within NFC signal range of the NFC reader, or other reading area.

At step 525, the POS terminal device 110 sends the payment instrument information to the mobile computing device 525. In some cases, the processor 345 in the secure enclosure 340 may encrypt the payment instrument information before the POA terminal device 110 sends the payment instrument information to the mobile computing device 105. Once the mobile computing device 105 receives the encrypted payment instrument information via the connectors 145 and 165, the mobile computing device 105 sends the encrypted payment instrument information to the payment processing server to process the payment.

The POS terminal device 110 may alternately be referred to as the POS device, the terminal device, the merchant device, the merchant POS device, or the merchant terminal device. The mobile computing device 105 may alternately be referred to as the mobile device, the computing device, the portable computing device, the user computing device, the merchant computing device, the portable device, the merchant device, or the user device.

Figure 6A:
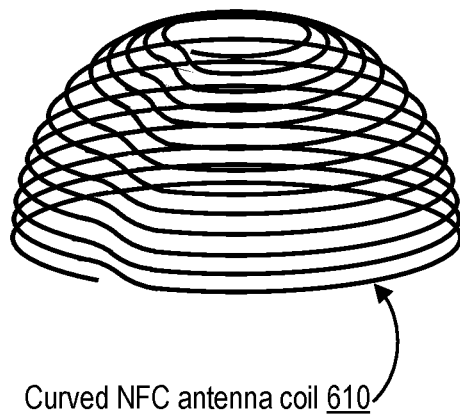
FIG. 6A illustrates a curved near field communication (NFC) antenna.

FIG. 6A illustrates a curved near field communication (NFC) antenna.

While traditional NFC antenna coils are flat, the curved NFC coil 610 illustrated in FIG. 6A is curved in a convex shape (from a perspective above the curved antenna coil 610 relative to the orientation shown in FIG. 6A) or a concave shape (from a perspective below the curved antenna coil 610 relative to the orientation shown in FIG. 6A). This shape of antenna coil may also be referred to as a dome shape or a bowl shape. The curved NFC antenna coil 610 ultimately produces a larger field than a flat NFC antenna coil of the same size. The curved form factor of the curved NFC antenna coil 610 can also be useful when used in the nest 115 of the POS terminal device 110 in that other components can be fit around its curves as shown in FIG. 6B.

Figure 6B:
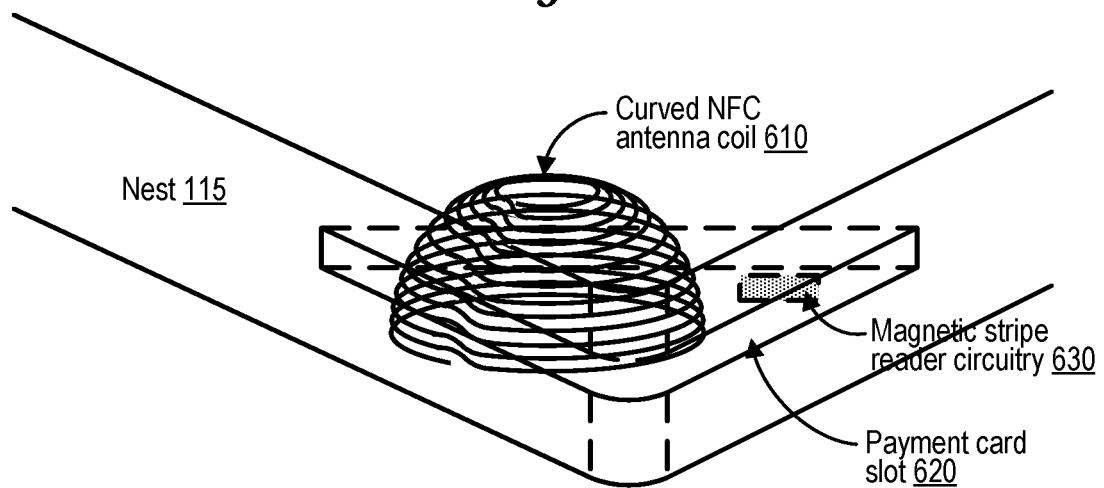
FIG. 6B illustrates a curved near field communication (NFC) antenna alongside a payment card slot within the point of sale (POS) terminal device.

FIG. 6B illustrates a curved near field communication (NFC) antenna alongside a payment card slot within the point of sale (POS) terminal device.

A corner of the nest 115 of the POS terminal device 110 is illustrated in FIG. 6B. The curved NFC antenna coil 610 is positioned within the nest 115 near the corner. A diagonal payment card slot 620 with a magnetic stripe reader 630 "cuts" the corner of the nest 115 partway up the height of the "dome" of the curved antenna coil 610. The stop wall of the payment card slot 620 along which a card is slid may be just adjacent to a part of the dome of the curved NFC antenna coil 610 in order to save space. In some cases, the card slot would collide with or cut into a "base" of the dome—the portion with the widest diameter—if the slot was any lower relative to the height of the dome, but does not do so because it is higher up relative to the height of the dome. In this way, the diameter at the base of the dome can be high, and the field may be correspondingly large, even while the slot 620 is able to overlap a portion of the curved antenna coil 610. Thus, space is saved and field strength is increased relative to traditional NFC antenna coils.

While curved NFC antenna coil 610 of FIGS. 6A and 6B is illustrated with a full "dome" shape (or "bowl" shape depending on perspective), in other cases a curved NFC antenna coil 610 may have a half dome/bowl shape or quarter dome/bowl shape.

Figure 6C:
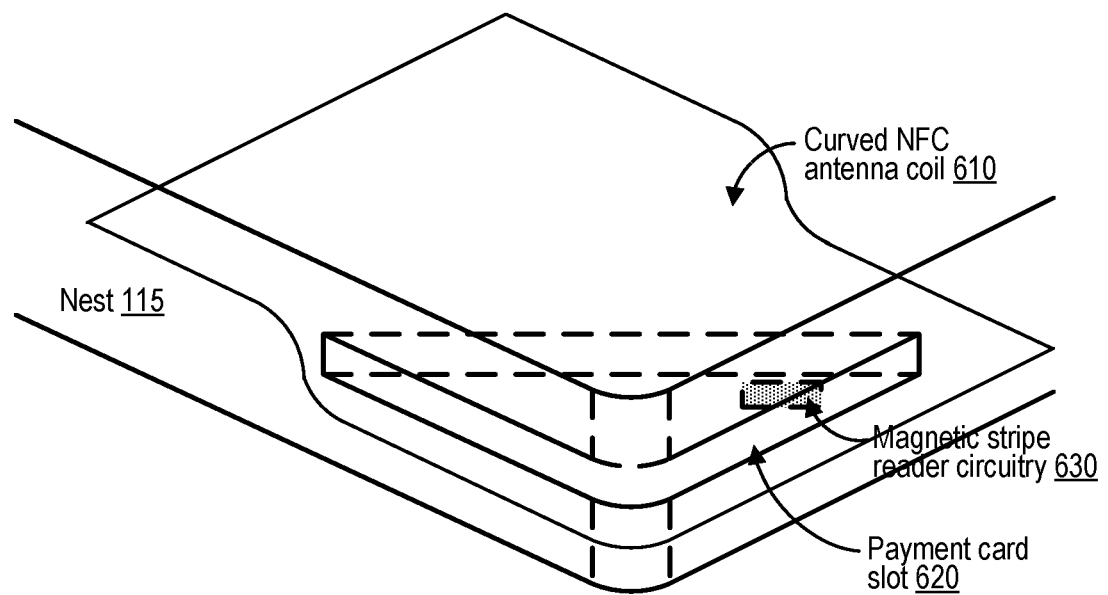
FIG. 6C illustrates a second type of curved near field communication (NFC) antenna alongside a payment card slot within the point of sale (POS) terminal device.

FIG. 6C illustrates a second type of curved near field communication (NFC) antenna alongside a payment card slot within the point of sale (POS) terminal device.

The second type of curved NFC antenna coil 610 is spread about a relatively flat surface, but where the flat surface is curved so as to represent two curved "steps." The "step" shape of the curved NFC antenna coil 610 is useful because NFC antenna coils often don't function well when a circuit board interferes with the signal. Thus, many components (not pictured), such as circuit boards, can be placed underneath the high "step" of the curved NFC antenna coil 610 of FIG. 6C without impacting performance. When a component that does not impact performance, such as the card slot 620, would best be better placed as close to the user as possible from a user experience standpoint, the curved NFC antenna coil 610 can curve down to its lower "step," which goes underneath the card slot 620. Other components (not pictured), such as circuit boards, may still be present underneath the lower "step" of the curved NFC antenna coil 610 of FIG. 6C.

Figure 7A:
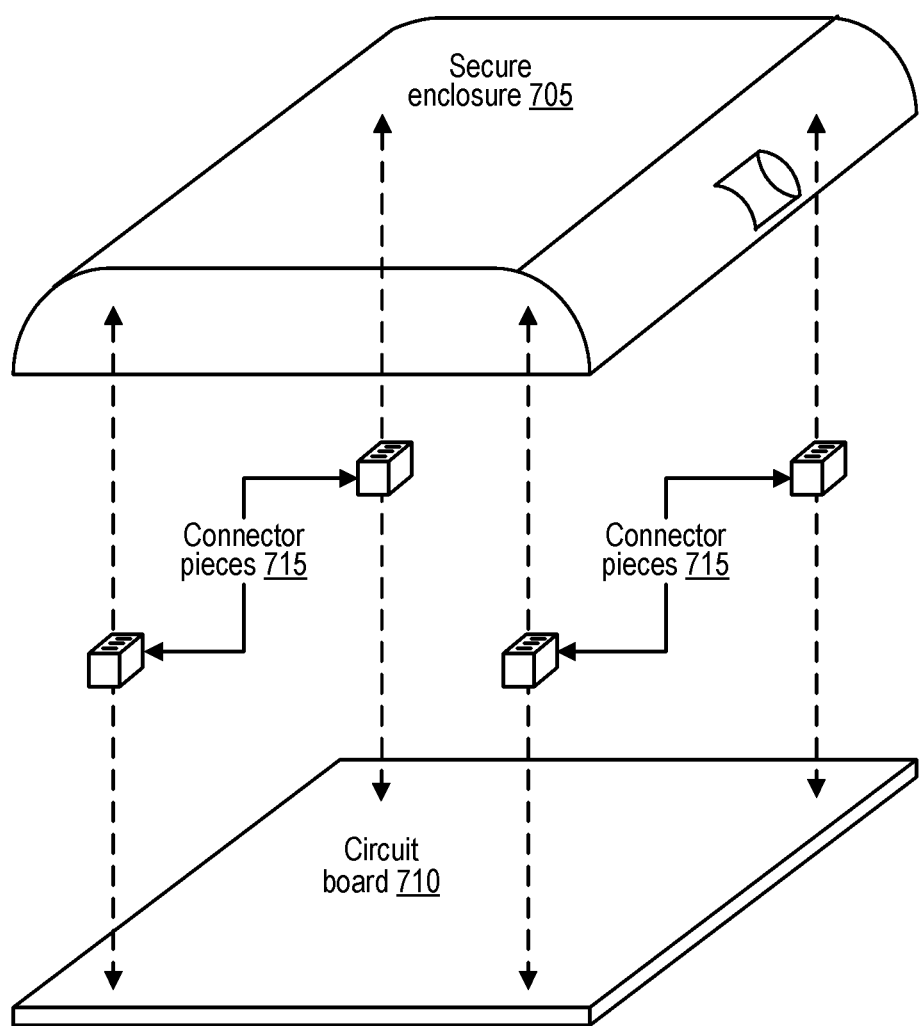
FIG. 7A illustrates an exploded view of a secure enclosure that encloses and connects to a circuit board.

FIG. 7A illustrates an exploded view of a secure enclosure that encloses and connects to a circuit board.

The exploded view of FIG. 7A illustrates a circuit board 710 protected by a secure enclosure 705. An exterior of the secure enclosure 705 is illustrated in FIG. 7A. The circuit board 710 may be one that reads, stores, and/or transmits sensitive information, such as encryption keys or payment instrument information. Both the circuit board 710 and the interior of the secure enclosure 705 include conductive elements that convey current and together form tamper detection circuitry 375. The portion of the tamper detection circuitry 375 that is on the circuit board 710 may be connected to the portion of the tamper detection circuitry 375 that is on the interior of the secure enclosure 705 via one or more connector pieces 715, which may include one or more conductive elements themselves. In some cases, the connector pieces 715 may be "zebra" connectors in which conductive elements and insulative (e.g., elastomeric) elements alternate.

FIG. 7B illustrates an interior of a secure enclosure that encloses and connects to a circuit board.

The interior surface 720 of the secure enclosure 705 includes tamper traces 730 of varying voltages that snake along the interior surface 720. The tamper traces are conductive lines that conduct a particular voltage. In particular, the solid lines represent tamper traces that conduct a first voltage, while the dashed lines represent tamper traces that conduct a second voltage different from the first voltage. In some cases, one of the voltages may be ground.

While the patterns of the tamper traces 730 form complex designs, the connections themselves are more straightforward to understand. In the example of FIG. 7B, a dashed line representing a single tamper trace at a first voltage snakes from point 760 to point 775. A solid line representing another single tamper trace at a second voltage snakes from point 765 to point 770. Another dashed line representing another single tamper trace at the first voltage snakes from point 740 to point 755. Another solid line representing another single tamper trace at the second voltage snakes from point 766 to point 770. The points 740, 745, 750, 755, 760, 765, 770, and 775 correspond to the locations of the four connector pieces 715 in FIG. 7A. That is, one or more circuits are formed from the tamper traces 730 and portions of the circuit board that provide the first voltage and the second voltages to those tamper traces 730 via the connector pieces 715. The circuit board 710 includes one or more voltage sensors, for example at or near its connections to the connector pieces 715. While the secure enclosure 705 is in a secure, un-tampered-with state, the voltage sensors may detect the first and second voltages, or a value based on these (such as a difference between the first and second voltage or vice versa, optionally amplified). If the voltage sensors detect an unexpected value that deviates from the expected voltage values by more than a tolerance (the tolerance corresponding to normal minor environmental noise and variations), then the tamper detection circuitry 375 of the circuit board 710 concludes that the secure enclosure 705, the circuit board 710, the connector pieces 715, or some combination thereof has been tampered with.

For example, if a malicious party drills through the secure enclosure 705, one or more of the tamper traces 730 will be broken which changes a tamper detection circuit from a closed to an open state and modifies voltages detected at the voltage sensor, for example by reducing a voltage to ground that is not expected to be at ground. The metal from the drill bit may also bridge two or more of the tamper traces 730 and form a short circuit or other unexpected connection, initiating unexpected current flow that also results in unexpected voltage values detected at the voltage sensor. Attempting to remove the secure enclosure 705 from the circuit board 710 will likewise terminate the connection between the taper traces 730 and the circuit board 710 and likewise change the voltages detected at the voltage sensors. Flooding the secure enclosure 705 with a conductive fluid, such as a conductive ink, likewise makes unexpected connections that likewise change the voltages detected at the voltage sensors. Thus, many different forms of tampering are detectable and can be protected against using a secure enclosure 705.

While only one secure enclosure 705 is illustrated in FIG. 7A covering one side of the circuit board 710, it should be understood that secure enclosures 705 can be used on both sides of a circuit board 710. Similarly, printed circuit boards (PCBs) may be manufactured that include an interior layer with tamper traces in similar patterns to the tamper traces 730 of FIG. 7B. Either way, the circuit board 710 protected by the secure enclosure 705 becomes protected from all sides.

Because any attempt to tamper with the secure enclosure 705 to access components within the secure enclosure 705 can be detected, precautions can be taken if a tamper attempt is detected, such as deleting or overwriting sensitive information such as encryption keys and/or transaction information read from a transaction object. As a result, components within a secure enclosure 705 can safely store, convey, or manipulate sensitive information. Still, additional security measures such as those illustrated in FIGS. 8A, 8B, 9A, 9B, 9C, 9D, 9E, 10, 12A, 12B, 13A, and 13B can serve to further enhance tamper detection and.

Figure 8A:
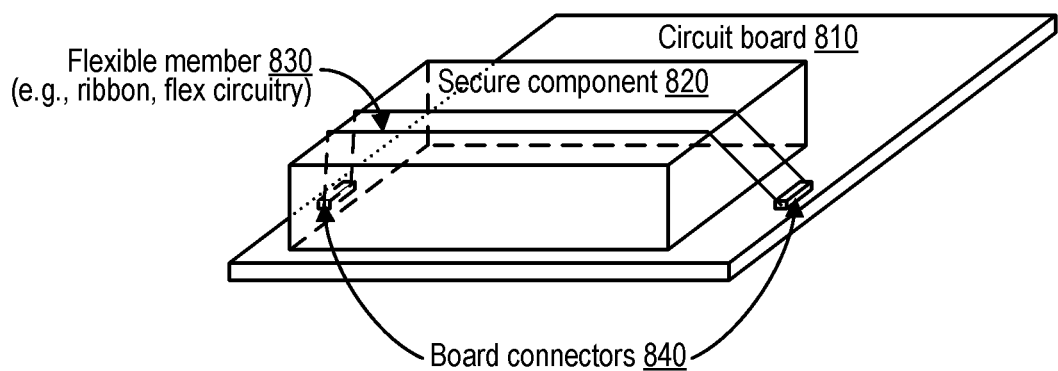
FIG. 8A illustrates a tamper detection system in which a flexible member with conductive traces is tightly wrapped around a secure component.

FIG. 8A illustrates a tamper detection system in which a flexible member with conductive traces is tightly wrapped around a secure component.

In particular, a circuit board 810 with a secure component 820, over a portion of the circuit board 810 is illustrated in FIG. 8A. The secure component 820 may be a secure enclosure or may be a different sensitive component, such as a memory element. A flexible member 830, which may be a ribbon cable or other flexible circuitry such as flexible printed circuitry (FPC), may include tamper traces within it, optionally with neighboring tamper traces in the flexible member 830 having alternating voltages, or otherwise having different voltages from one another. The flexible member 830 is wrapped tightly around the secure component 820 and connects back to the circuit board at two board connectors 840. The circuit board 810 may check voltages coming from the board connectors 840 to identify if the flexible member 830 has been at least partially removed from either of the board connectors 840, whether the flexible member 830 has been torn, whether any of the tamper traces in the flexible member 830 have been connected to one another unexpectedly to form a short circuit or other unexpected connection resulting in an unexpected voltage at the voltage sensor.

Figure 8B:
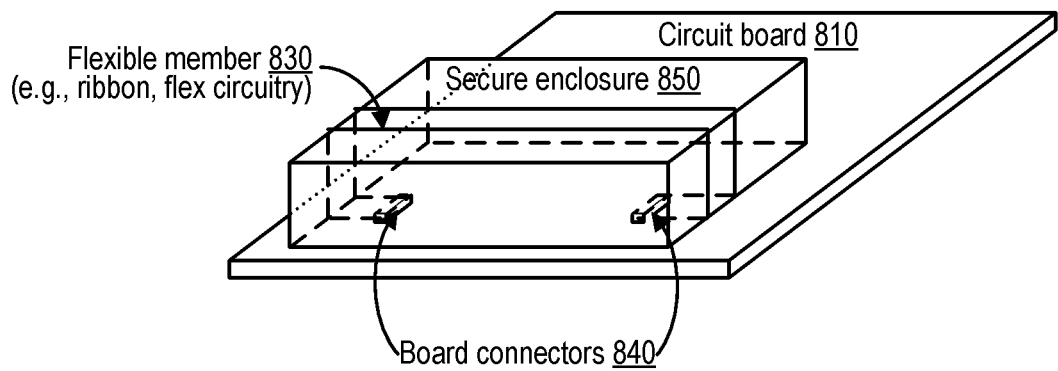
FIG. 8B illustrates a tamper detection system in which a flexible member with conductive traces is tightly wrapped around a secure enclosure.

FIG. 8B illustrates a tamper detection system in which a flexible member with conductive traces is tightly wrapped around a secure enclosure.

The flexible member 830 is used similarly in FIG. 8B as in FIG. 8A, though in this case the secure component 820 is a secure enclosure 850. Because a secure enclosure is used, the board connectors 840 can be placed inside the secure enclosure 850, further increasing difficult to tamper with the flexible member 830 or its connections. If the flexible member 830 in FIG. 8A or FIG. 8B is wrapped tightly specifically over areas of a secure enclosure 850 where the connector pieces 715 connect the circuit board 810 to the tamper traces of the secure enclosure 850, then the potential attacker no longer has unimpeded access to the secure enclosure 850, and therefore has more obstacles to overcome without detection if they still wish to attempt to tamper with the device.

In some case, a flexible member 830 with tamper traces that is tightly wrapped around a secure component 820 or enclosure 850 as in FIG. 8A and FIG. 8B may be referred to as a tamper belt 830. In some cases, tamper detection circuitry 375 only includes limited number of tamper lines, and thus tamper detection features (e.g., the tamper belt 830, the traces 730 of the secure enclosure 705, the flexible member 905) must be daisy chained together in series. In such a case, a benefit can be gained if both upstream lines that live on the same tamper detection feature are not tied to two downstream elements that also live on a shared element. For example, if a left-side connector piece 715 is removed, this can cause two tamper warnings on lines "enclosure L+" and "enclosure L−." If a right-side connector piece 715 is removed, this can cause two tamper warnings on lines "enclosure R+" and "enclosure R−." If the tamper belt 830 is removed from a connector, this can cause two tamper warnings on lines "Belt+" and "Belt−." If the enclosure and belt lines must be daisy chained together, then for example daisy chaining Belt+ with Enclosure L+, and Belt− with Enclosure L− can be problematic in that, if both the "Belt+"/"Enclosure L+" line and the "Belt−"/"Enclosure L−" line detect a tamper attempt, then we do not know if the tamper belt 830 was removed or if the left connector 715 was removed. However, if we instead, for example, daisy chain Belt+ with Enclosure L+ and Belt− with Enclosure R−, then if both the "Belt+"/"Enclosure L+" line and the "Belt−"/ "Enclosure R−" line detect a tamper attempt, we know that the tamper attempt was detected at the tamper belt 830.

Figure 9A:
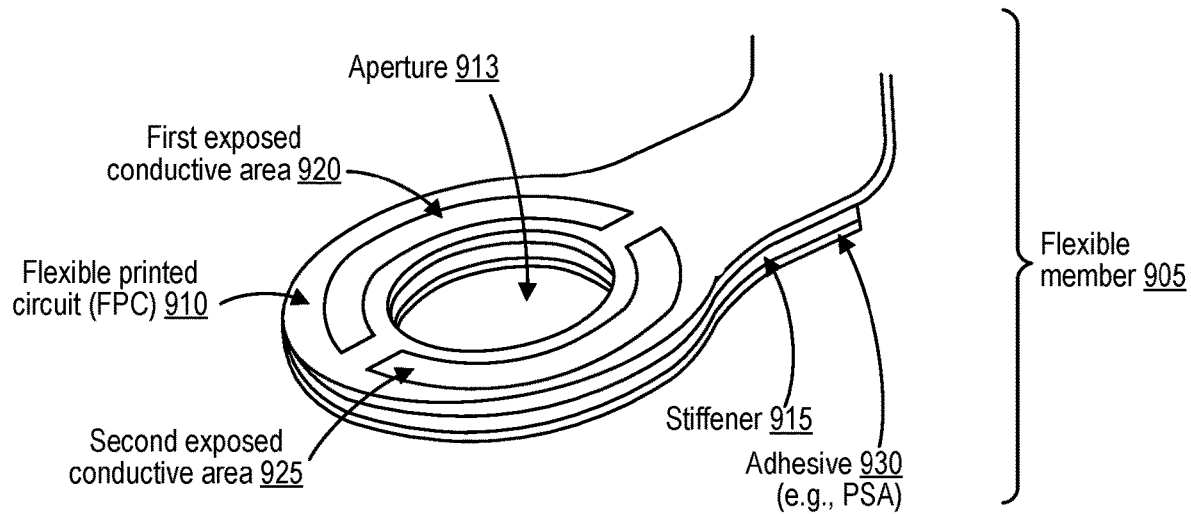
FIG. 9A illustrates a flexible member used in a tamper detection system that detects tampering with a screw.

FIG. 9A illustrates a flexible member used in a tamper detection system that detects tampering with a screw.

The flexible member 905 may be connected at one end (not shown) to a circuit board, which may attempt to run current through one or more conductive traces within of the flexible member 905 and may use one or more voltage sensors to monitor voltage along the traces of the flexible member 95.

The flexible member 905 may include a flexible printed circuit (FPC) 910, which may form a top surface of the flexible member 905. The flexible member 905 may include an aperture 913 (which may be referred to as an opening) through which a shank 940 of a screw 935 may pass. On the top surface of the flexible member 905, the FPC 910 may include a first exposed conductive area 920 and a second exposed conductive area 925. The first exposed conductive area 920 may be an endpoint of a first conductive trace running along the length of the flexible member 905 but not exposed other than at the first exposed conductive area 920. Likewise, the second exposed conductive area 925 may be an endpoint of a second conductive trace running along the length of the flexible member 905 but not exposed other than at the second exposed conductive area 925. If the first exposed conductive area 920 and the second exposed conductive area 925 were to be bridged, these two traces would be connected, and a circuit would be closed that is otherwise open while the first exposed conductive area 920 and the second exposed conductive area 925 remain exposed.

Below the FPC 910, the flexible member 905 may optionally include a stiffener 915 to protect the portion of the flexible member 905 that comes in contact with the shank 940 of the screw 935 from damage by the screw 935. Below the FPC 910 and the stiffener 915, the flexible member 905 may include an adhesive 930, such as a pressure sensitive adhesive (PSA).

Figure 9B:
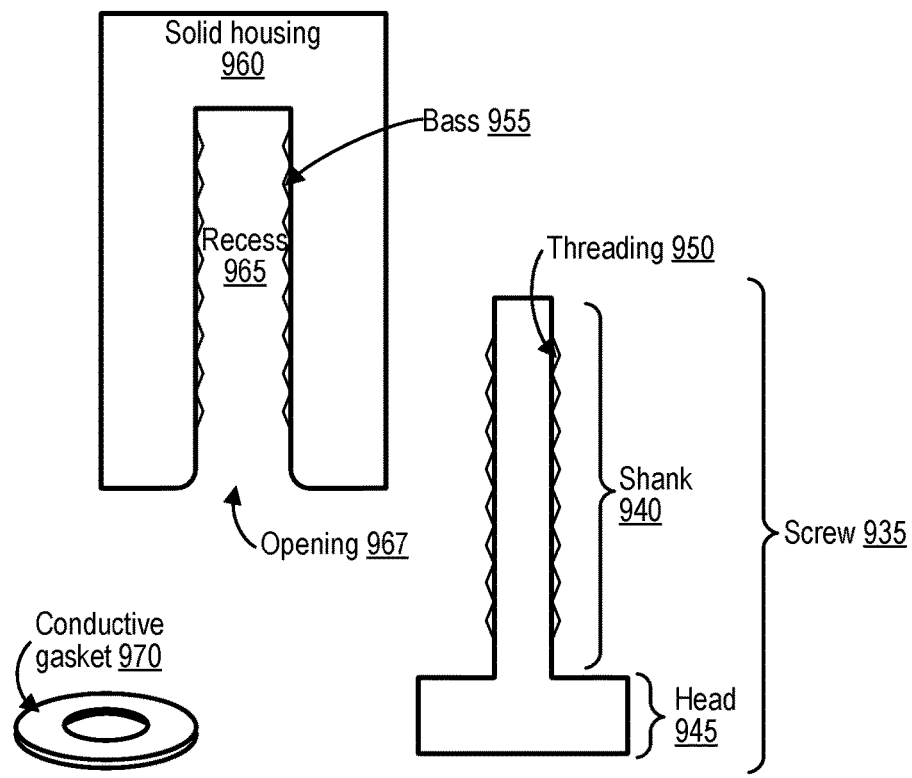
FIG. 9B illustrates the screw, a recessed housing, and a conductive gasket that are also used in the tamper detection system that detects tampering with the screw.

FIG. 9B illustrates the screw, a recessed housing, and a conductive gasket that are also used in the tamper detection system that detects tampering with the screw.

The screw 935, housing 960, and conductive gasket 970 of FIG. 9B are used together with the flexible member 905 of FIG. 9A to form another type of tamper detection circuitry 375 that ensures that the screw 935 remains screwed into the solid housing 960. The screw 935 includes a screw head 945 and a screw shank 940. The screw shank 940 may include threading 950.

The solid housing 960 may be part of the housing of the POS terminal device 110 and may include one or more solid substance such as wood, plastic, metal, or some combination thereof. The solid housing 960 may include a recess 965 with an opening 967. The at least a portion of the shank 940 of the screw 935 may fit into at least a portion of the recess 965 through the opening 967 in the solid housing 960. The recess 965 may include a bass 955 that the threading 950 of the screw 935 may thread into or screw into. The conductive gasket 970 as illustrated in FIG. 9B is a gasket made from a conductive material such as a metal with an aperture (which may be referred to as an opening) through which the shank 940 of the screw 935 may pass. The aperture may be in the center of the conductive gasket 970. The conductive gasket 970 may also include a layer of adhesive 975, such as pressure sensitive adhesive (PSA), on one side, as illustrated further in FIGS. 9C, 9D, and 9E. In some cases, the conductive gasket 970 may be or include a bolt or washer. In some cases, the conductive gasket 970 may be metallic.

FIG. 9C illustrates an exploded side view of the tamper detection system that detects tampering with a screw.

The shank 940 of the screw 935 is partially inserted into the recess 965 in FIG. 9C. The shank 940 of the screw 935 also passes through the opening in the conductive gasket 970 and through the opening in the flexible member 905. The flexible member 905 is positioned adjacent to the head 945 of the screw 935, with the adhesive 930 of the flexible member 905 facing the head 945 and the two exposed conductive areas 920/925 facing away from the head 945 and toward the conductive gasket 970 and the solid housing 960. The conductive gasket 970 is positioned between the flexible member 905 and the solid housing 960, with the adhesive 975 of the conductive gasket 970 facing the solid housing 960 while the conductive side of the conductive gasket 970 (the side without the adhesive 975) faces the flexible member 905.

FIG. 9D illustrates a side view of the tamper detection system of FIG. 9C in a secure state.

The system of FIG. 9D is the same as the system of FIG. 9C, but with the screw 935 screwed into the recess 965 as far as it can be, thus compressing the flexible member 905 and the conductive gasket 970 between the head 945 of the screw 930 and the solid housing 960. In this secure, untampered-with state, the conductive side of the conductive gasket 970 is in contact with the two exposed conductive areas 920 and 925 of the flexible member 905, thus closing the circuit formed using the traces of the flexible member 905. The circuit board that the flexible member connects to can determine that the circuit is closed via one or more voltage sensors.

The adhesive 975 affixes or adheres the conductive gasket 970 to at least a portion of the solid housing 960 (e.g., a portion around or adjacent to the opening 967), while the adhesive 930 of the flexible member 905 affixes or adheres the flexible member 905 to the head 945 of the screw 935. Thus, if a malicious party attempts to unscrew the screw 935 from the recess 965 in the housing 960, the conductive gasket 970 will remain adhered to the solid housing while the flexible member 905 will remain adhered to the head 945 of the screw 935. Thus, the conductive gasket 970 will no longer be in contact with the two exposed conductive areas 920 and 925 of the flexible member 905, and the circuit will go from closed to opened. The circuit board that the flexible member 905 connects to will be able to determine, via one or more voltage sensors, that the circuit is now open, and can determine that the POS terminal device 110 has been tampered with. The flexible member 905 may in some cases connect to a circuit board via a board connector within a secure enclosure, such as the board connectors 840 of FIG. 8B.

FIG. 9E illustrates a side view of the tamper detection system of FIG. 9D with a second solid housing element.

The tamper detection system of FIG. 9E also includes a second solid housing element 980 between the conductive gasket 970 and the head 945 of the screw 935. The second solid housing element 980 may include one or more solid substances such as wood, plastic, metal, or some combination thereof. The second solid housing element 980 may include the one or more of the same solid substances as included in the solid housing 960 and/or may include one or more solid substances that are different than those included in the solid housing 960. The second solid housing element 980 may include an aperture through which the shank 940 of the screw 935 may pass.

When screwed into the recess 965, the screw 935 thus serves to secure the solid housing 960 to the second solid housing element 980. The adhesive 930 of the conductive gasket 970 may adhere to the second solid housing element 980 in FIG. 9E instead of to the head 945 of the screw 935 as in FIG. 9D. An additional layer of adhesive 985, which may be pressure sensitive adhesive (PSA), may also be included that adheres the second solid housing element to the head 945 of the screw 935.

An alternate arrangement of the system of FIG. 9E instead positions the second solid housing element 980 between the solid housing 960 and the conductive gasket 970. In this case, the adhesive 975 may adhere the top of the conductive gasket 970 to the second solid housing element 980 instead of adhering the top of the conductive gasket 970 to the solid housing 980 as illustrated in FIGS. 9D and 9E, and the adhesive 985 may be positioned between the second solid housing element 980 and the solid housing 960 to adhere the second solid housing element 980 to the solid housing 960.

In some cases, the screw 930 of FIGS. 9B-9E may instead be a nail, a rivet, a peg, a dowel, a post, or another type of fastener. In some cases, one or more bolts, washers, gaskets, or combinations thereof may be added between the elements illustrated in FIGS. 9C-9E.

While FIGS. 9C-9E illustrate the conductive gasket 970 above the flexible member 905—that is, the conductive gasket 970 closer to the solid housing 960 while the flexible member 905 is closer to the head 945 of the screw 935—these positions may be reversed. Thus, in an alternate embodiment, the conductive gasket 970 may be affixed or adhered to the head 945 of the screw 935, while the flexible member 905 is affixed or adhered to at least a portion of the solid housing 960, with the two exposed conductive areas 920 and 925 facing toward the conductive gasket 970.

In some cases, the conductive gasket 970 may be omitted entirely. Instead, the flexible member 905 may be affixed or adhered to at least a portion of the solid housing 960, with the two exposed conductive areas 920 and 925 facing toward the head 945 of the screw 935. The head 945 of the screw 935 may be conductive (e.g., metallic) and may close the circuit when the screw 936 is screwed into the recess 965 by forming an electrical connection bridging the first exposed conductive area 920 and the second exposed conductive area 935. Alternately, the flexible member 905 may be affixed or adhered to at least a portion of the head 945 of the screw 935, with the two exposed conductive areas 920 and 925 facing toward the solid housing 960, and the solid housing 960 may include a conductive (e.g., metallic) area around or adjacent to the opening 967 such that this conductive area of the solid housing 960 closes the circuit when the screw 935 is screwed into the recess 965 by forming an electrical connection bridging the first exposed conductive area 920 and the second exposed conductive area 935. The conductive area of the solid housing 960 could include a threaded insert, and may in some cases also conduct through the bass 955 and/or the shank 940 of the screw 935. Alternately, in a situation where the exposed conductive areas 920 and 925 face the second solid housing element 980. the second solid housing element 980 may include a conductive (e.g., metallic) area around or adjacent to its aperture such that this conductive area of the second solid housing element 980 closes the circuit when the screw 935 is screwed into the recess 965 by forming an electrical connection bridging the first exposed conductive area 920 and the second exposed conductive area 935.

While the flexible member 905 is illustrated with a circular aperture 913 with the first exposed conductive area 920 and the second exposed conductive area 925 adjacent to the aperture 913, the aperture 913 may be of a different shape, and in some cases the flexible member 905 need not have an aperture 913 at all. For example, the flexible member 905 may have two "prongs" arranged with an opening between, such as in a "U" shape or a "V" shape, with the shank 940 of the screw passing through the opening between the prongs, with the prongs themselves being squeezed against the conductive gasket 970 and/or solid housing 960 and/or second solid housing element 980 by the head 945 of the screw 935 when the screw 935 is screwed into the recess 965. Alternately, a flexible member 905 with no aperture 913 may simply have a portion that is positioned adjacent to one or more sides of the shank 940 of the screw 945, so that the head 945 of the screw 935 squeezes the portion of the flexible member 905 that is adjacent to the shank 940 against the conductive gasket 970 and/or solid housing 960 and/or second solid housing element 980 when the screw 935 is screwed into the recess 965. Likewise, the conductive gasket 970 and/or second solid housing element 980 need not have circular apertures as illustrated and described herein, but may have apertures of other shapes, or may instead have pronged "U" or "V" shapes, or may have no aperture but instead simply have a portion that is adjacent to the shank 940 of the screw 935 so that the head 945 of the screw 935 squeezes the portion against the other elements (e.g., flexible member 905, solid housing 960, conductive gasket 970, and/or second solid housing element 980) when the screw 935 is screwed into the recess 965.

Figure 10:
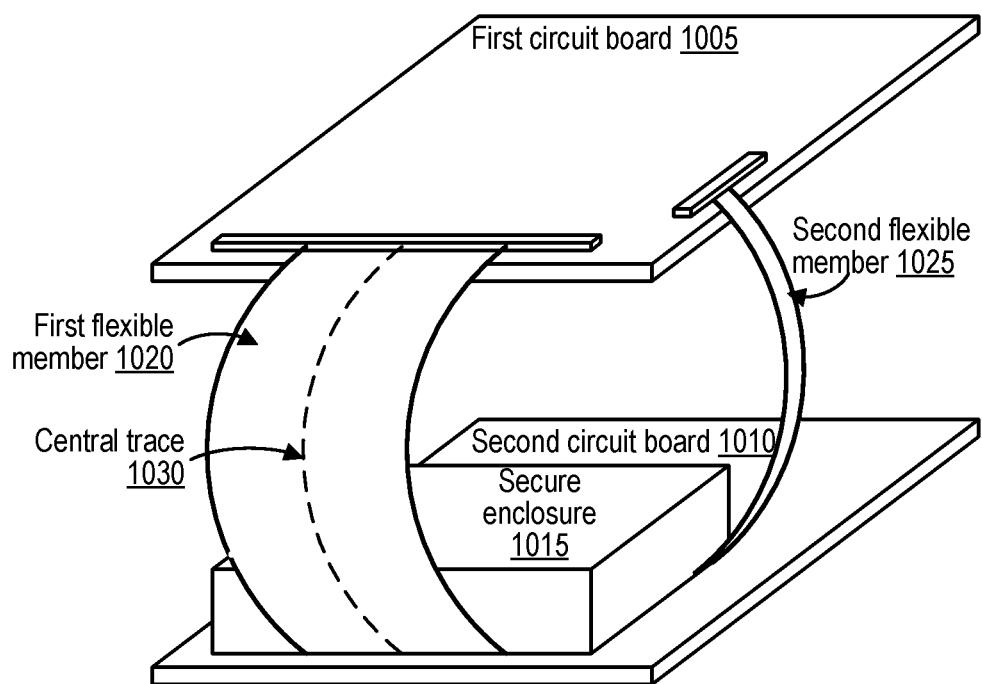
FIG. 10 illustrates a tamper detection system in which one or more flexible members with conductive traces bridge two circuit boards.

FIG. 10 illustrates a tamper detection system in which one or more flexible members with conductive traces bridge two circuit boards.

A first circuit board 1005 and a second circuit board 1010 are illustrated in FIG. 10. The second circuit board 1010 includes a secure enclosure 1015. The first circuit board 1005 and the second circuit board 1010 are connected to one another via a first flexible member 1020 and a second flexible member 1025. Both the first flexible member 1020 and a second flexible member 1025 include tamper traces at different voltages. Tamper detection circuitry 375 within the secure enclosure 1015 monitors one or more voltages for each tamper trace of the first flexible member 1020 and a second flexible member 1025 to identify tampering by detecting unexpected voltages. Because the first board is connected closely to the secure enclosure 1015 and cannot undetectably be moved away from the secure enclosure 1015, a potential attacker no longer has unimpeded access to the secure enclosure 1015.

While the two flexible members 1020 and 1025 are illustrated as quite long with a fair amount of slack, it should be understood that this is just for illustrative purposes, to make the diagram easier to interpret. In some implementations, the first and second flexible members 1020 and 1025 are much shorter, for example short enough that the first circuit board and secure enclosure must touch, or must be within millimeters of one another, in order for the two flexible members 1020 and 1025 to remain connected to both boards 1005 and 1010. Thus, the first circuit board 1005 and the two (or more) flexible members 1020 and 1025 impede access to the secure enclosure 1015, and a potential attacker has no space in which to insert any drill or other tool over or around the secure enclosure 1015, increasing security and tamper detectability further. In some cases, one or more flexible members 1020 and 1025 that bridge different circuit boards as in FIG. 10 may be used in combination with one or more flexible members 830 on one or more circuit boards with secure enclosures and/or other secure components as in FIGS. 8A and 8B, thus providing additional protections for secure enclosures or other secure components.

While only two flexible members 1020 and 1025 are illustrated, more may be used. In particular, FIG. 10 illustrates the first flexible member 1020 on the "bottom" side of the secure enclosure 1015 and the second flexible member 1025 on the "right" side of the secure enclosure 1015. In some cases, a third flexible member may connect at the "left" side of the secure enclosure 1015, and/or a fourth flexible member may connect at the "top" side of the secure enclosure 1015.

Some of the flexible members, such as the first flexible member 1020, may include data traces that convey data and/or power traces that convey power as well as tamper traces. In such cases, having the tamper traces be mostly in the center of the flexible member, for example at the highlighted central trace 1030 and/or nearby traces, provides an added benefit of making it difficult for malicious parties to specifically manipulate tamper traces as opposed to power or data traces. Keeping tamper traces central within the flexible member also enables nearby power and data traces to act as tamper traces by modifying the voltage of the tamper traces in a manner that is detectable by the voltage sensor(s) in the secure enclosure 1015.

Figure 11A:
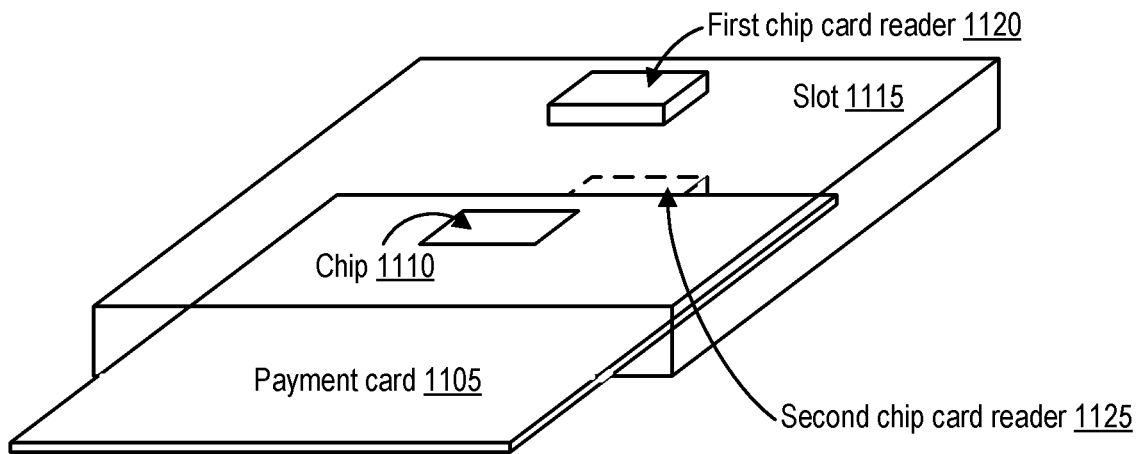
FIG. 11A illustrates a chip card reader device with reader circuitry on either side of a slot.

FIG. 11A illustrates a chip card reader device with reader circuitry on either side of a slot.

A payment card 1105 of FIG. 11A includes an IC chip 1110, and is inserted into a slot 1115. The slot includes a first chip card reader 1120 on one side of the slot 1115, and a second chip card reader on the other side of the slot 1115. Thus, regardless of which way the card 1105 is inserted into the slot 1115—with the chip facing one direction or the other—the payment instrument data will be read from the IC chip 1110 of the card 1105.

In some cases, one or both of the chip card readers of FIG. 11A may be circuitry along a flexible member that wraps around the slot 1115, such as the flexible member 830 of FIG. 8A and FIG. 8B. Such as flexible member may include tamper traces as well as data traces (for conveying payment instrument data) and power traces (for powering the reader). Thus, the system of FIG. 11A may provide the benefits of convenience and ease of use for customers that can enter a card in either direction, as well as added security and tamper detectability.

Figure 11B:
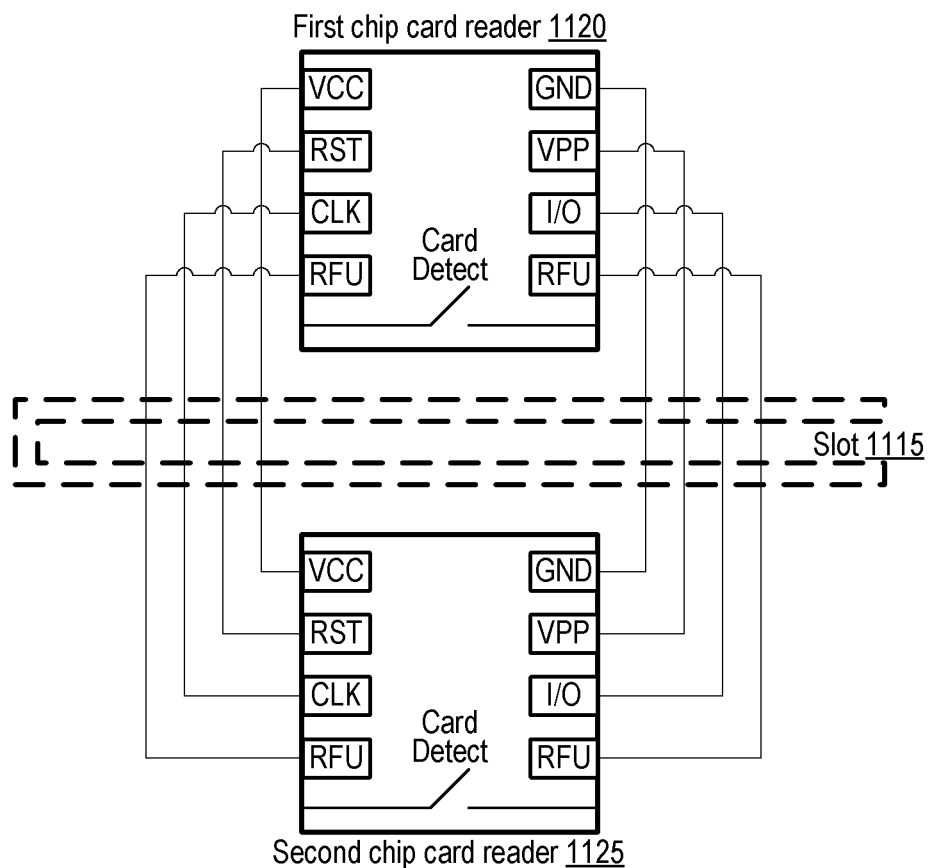
FIG. 11B illustrates a circuit diagram of a chip card reader device with reader circuitry on either side of a slot.

FIG. 11B illustrates a circuit diagram of a chip card reader device with reader circuitry on either side of a slot.

The first chip card reader 1120 and the second chip card reader 1125 include many of the same elements. That is, voltages of the common collector ($V_{cc}$), programming power supply (Vpp), and ground; a rest line; a clock line; and input/output (I/O) line; optional reserved for future use (RFU) lines, and a card detection mechanism that detects the presence of the card 1105 of the IC chip 1110 early as the card 1105 is entering the slot 1115 to start prepare the reader components to read before the IC chip reaches the reader 1120 or 1225. The card detection mechanism may function, for example, by the card 1105 flipping a mechanical switch or momentary button, or by the conductive material of the IC chip closing an open circuit in the slot 1115 (e.g., two conductive prongs from an open circuit may stick out into the slot 1115 over a position that the IC chip is expected to pass). In some cases, the card detection mechanism may be missing from one or both IC chip readers of FIG. 11A and FIG. 11B.

Figure 12A:
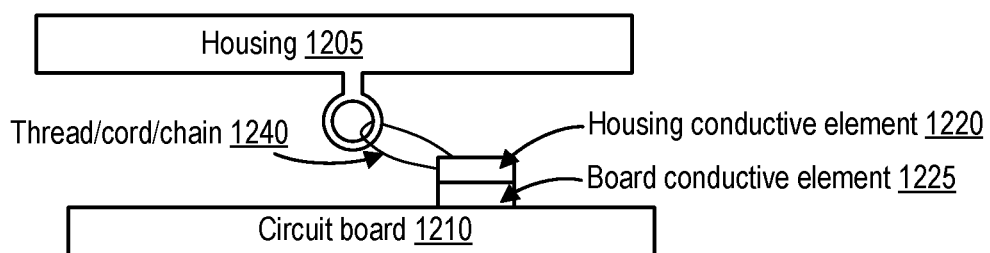
FIG. 12A illustrates a tamper detection system with a housing and a circuit board in a secure state.

FIG. 12A illustrates a tamper detection system with a housing and a circuit board in a secure state.

The tamper detection system of FIG. 12A is made to detect separation between to objects, here labeled as a housing 1205 and a circuit board 1210. The circuit board 1210 includes a board conductive element 1225, which may in reality include two exposed conductive areas that, together with circuitry on the circuit board 1210, form an open circuit similarly to the two exposed conductive areas 920 and 925 of the flexible member 905 of FIG. 9A. The housing 1205 is coupled, for example via a thread or cord or chain 1240, to a housing conductive element 1220 that closes the circuit. This is the secure, un-tampered-with state. The circuit board 1210 may include one or more voltage sensors that can determine that the circuit is closed based on one or more detected voltages, and may thereby determine that the system (the housing 1205 and circuit board 1210) has not been tampered with. In some cases, the thread/cord/chain 1240 also conducts and is part of the circuit, so that severance of the thread/cord/chain 1240 opens the circuit and produces a change in voltage that is detectable via the one or more voltage sensors, ultimately being detected as a tamper attempt. In some cases, the thread/cord/chain 1240 may instead be a rigid post or rib similar to the pushing rib 1315 of FIGS. 13A and 13B, with the housing conductive element 1220 attached to the tip of the post/rib.

Figure 12B:
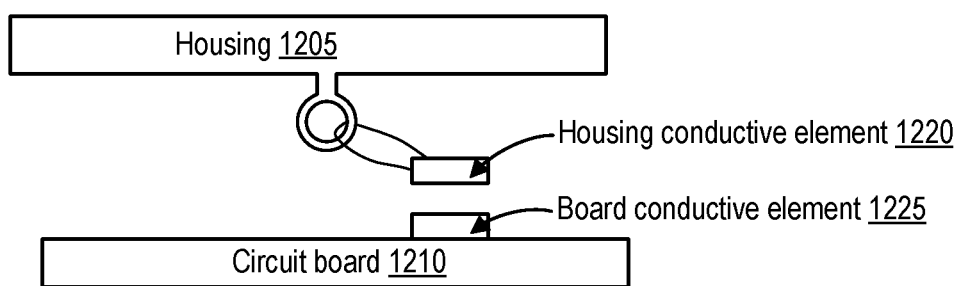
FIG. 12B illustrates the tamper detection system of FIG. 12A in a non-secure tampered-with state in which the housing is separated from the circuit board.

FIG. 12B illustrates the tamper detection system of FIG. 12A in a non-secure tampered-with state in which the housing is separated from the circuit board.

The housing 1205 has been lifted away from the circuit board 1210 in FIG. 12B relative to the secure state of FIG. 12A. Lifting the housing 1205 causes the housing conductive element 1220 to lift up and away from the board conductive element 1225 as well, pulled away by the thread/cord/chain 1240, opening the circuit. The circuit board 1210 may include one or more voltage sensors that can determine that the circuit has been opened based on one or more detected voltages, and may thereby determine that the system (the housing 1205 and circuit board 1210) has been tampered with.

Figure 13A:
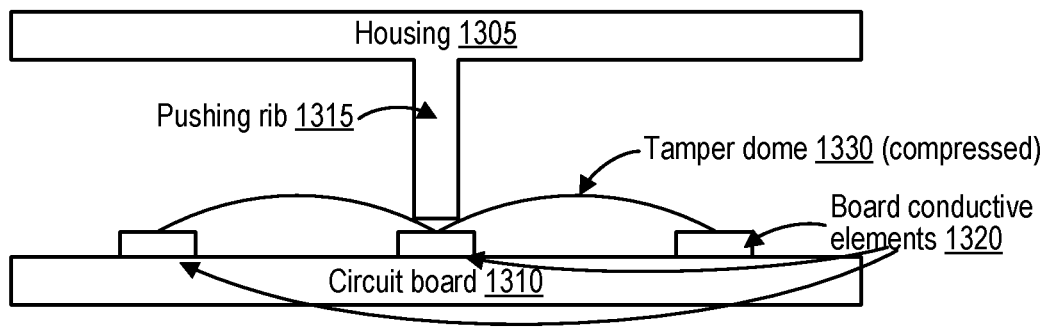
FIG. 13A illustrates a tamper detection system in a secure state in which a tamper dome is compressed.

FIG. 13A illustrates a tamper detection system in a secure state in which a tamper dome is compressed.

The housing 1305 of FIG. 13A includes a pushing rib 1315 that pushes on a tamper dome 1330 that can be compressed or uncompressed. The tamper dome 1330 is made from a conductive material and is compressed in FIG. 13A, and in doing so, makes contact with a central multiple board conductive element 1320, connecting it to two other board conductive elements 1320, completing a circuit. This is the secure, un-tampered-with state. The circuit board 1310 may include one or more voltage sensors that can determine that the circuit is closed based on one or more detected voltages, and may thereby determine that the system (the housing 1305 and circuit board 1310) has not been tampered with.

Figure 13B:
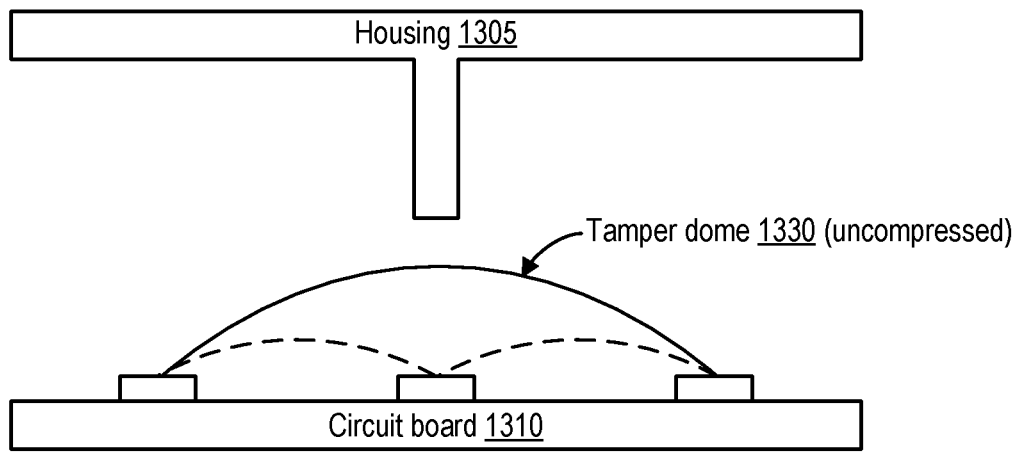
FIG. 13B illustrates the tamper detection system of FIG. 13A in a non-secure tampered-with state in which the tamper dome is uncompressed.

FIG. 13B illustrates the tamper detection system of FIG. 13A in a non-secure tampered-with state in which the tamper dome is uncompressed.

The housing 1305 has been lifted away from the circuit board 1310 in FIG. 13B relative to the secure state of FIG. 13A. Lifting the housing 1305 causes the pushing rib 1315 to stop pushing the tamper dome 1330, and thus causes the tamper dome 1330 to decompress and to lift up and away from the central board conductive element 1220, opening the circuit. The circuit board 1310 may include one or more voltage sensors that can determine that the circuit has been opened based on one or more detected voltages, and may thereby determine that the system (the housing 1305 and circuit board 1310) has been tampered with.

In some cases, tamper dome systems as in FIG. 13A and FIG. 13B may be used in combination with the conductive element systems of FIG. 12A and FIG. 12B in the same device, such as the POS terminal device 110.

FIG. 14 illustrates the point of sale (POS) terminal rotating about a base along various axes.

In particular, the POS terminal device 110 includes the frame 130A secure to the surface 205, and includes the mobile computing device 105A within the cavity 140 and secured using a latch 135 of the frame 130A.

The POS terminal device 110 may rotate about its base 150 about several axes. The POS terminal device 110 may rotate about a vertical Y axis 1415, for example performing the illustrated counter-clockwise rotation 1410 about the Y axis 1415, or an opposite clockwise rotation about the Y axis 1415. Rotation 1410 about the Y axis 1415 may be used to rotate the POS terminal device 110 between facing a merchant (a merchant position) and facing a customer (a customer position).

The POS terminal device 110 may rotate about a horizontal X axis 1425, for example performing the illustrated upward rotation 1420 about the X axis 1425, or an opposite downward rotation about the X axis 1425. Rotation 1420 about the X axis 1425 may be used to tilt the cradle 120 and nest 115 up or down to adjust for users of different heights.

The POS terminal device 110 may rotate about a Z axis 1435 that extends out from the paper of FIG. 14, for example performing the illustrated counterclockwise rotation 1430 about the Z axis 1435, or an opposite clockwise rotation about the Z axis 1435. Rotation 1430 about the Z axis 1435 may be used to rotate the POS terminal device 110 so that the nest 115 is above the cradle 120, or to the left of the cradle 120, or below the cradle 120, rather than to the right of the cradle 120.

Rotation about all three axes, and even additional diagonal axes between these three axes, may in some cases be used in combination.

A pin 1450 is also illustrated in FIG. 14 as passing through an opening in the frame 130 and into a port or other opening of the mobile computing device 105A. If a mobile computing device 105 includes an audio jack or other port that is otherwise unused by the POS terminal device 110, a pin 1450 or screw may be inserted to help secure the mobile computing device 105 in place within the POS terminal device 110.

A headphone jack 1480 and USB port 1485 are also illustrated in the nest 115 of FIG. 14. The headphone jack 1480 may be an example of an audio component 387 of FIG. 3 and/or of a peripheral connector 383 of FIG. 3. The USB port 1485 may likewise be an example of a peripheral connector 383 of FIG. 3 and/or of an audio component 387 of FIG. 3.

In some cases, the base 150 of a POS terminal device 110 may be detached from the housing (e.g., the cradle 120 and nest 115) of the POS terminal device 110 and carried as a handheld device or reattached to a different base 150. In such cases, the base 150 may be attached to the rest of the POS terminal device 110 via one or more screws and/or pins, which may be used similarly to the screw/pin 460 and/or the pin 1450. Different styles of bases 150 may be provided, such as a short base whose height is appropriate for a user to use while the POS terminal device 110 is on a table or countertop, a medium base whose height is appropriate for a user to use while the POS terminal device 110 is standing on the floor and the user is sitting, and a tall base 150 whose height is appropriate for a user to use while the POS terminal device 110 is standing on the floor and the user is standing. In some cases, some bases may enable or disable rotation of the housing of the POS terminal device 110 about the base 150 about one or more of the axes 1415, 1425, and/or 1435. In some cases, the base 150 may be a wall mount or a ceiling mount rather than a stand, and may still enable rotation of the housing about the base about one or more of the axes 1415, 1425, and/or 1435. In some cases, a cable (of any type discussed with respect to the input devices 1950 and/or the output devices 1960 of FIG. 19) may pass through the base 150, including through one or more power and/or data cables. Such a cable may use a liquid ingress prevention seal as illustrated in and discussed with respect to FIG. 16A and/or FIG. 16B. Such a cable may lead to the nest 115, for example to power the components of the nest 115 and/or charge a battery of the nest 115. Such a cable may alternately or additionally lead to the mobile computing device 105, for example to power the components of the mobile computing device 105 and/or charge a battery of the mobile computing device 105. Such a cable may in some cases pass through one or more hinges, bearings, or joints. Such a cable may in some cases plug into a port in a hinge, bearing, or joint, beyond which the cable's power and/or data is conveyed through the hinge, bearing, or joint via an alternate power and/or data conveyance such as a ribbon cable, a FPC, inductive power, NFC, RFID, wireless transceiver(s), or another structure.

Figure 15A:
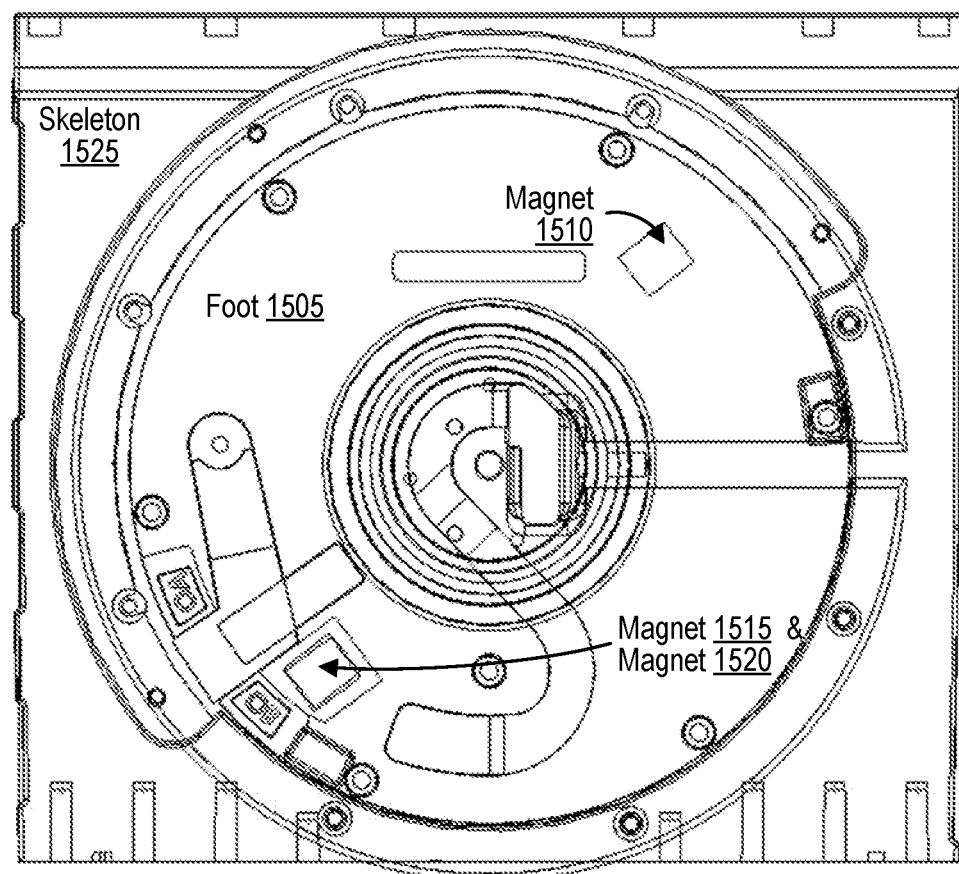
FIG. 15A illustrates a base about which the point of sale (POS) terminal device may rotate that uses magnetic dampener.

FIG. 15A illustrates a base about which the point of sale (POS) terminal device may rotate that uses magnetic dampener.

A base 150 is illustrated. The base 150 includes a rotating foot 1505 and a skeleton 1525. The rotation 1410 about the Y axis 1415 may be executed via rotation of the foot 1505 about the skeleton 1525. The skeleton 1525 includes two skeleton magnets 1510 and 1515. The foot 1505 includes one foot magnet 1520, which can be attracted to either of the two skeleton magnets 1510 and 1515 depending on the rotational position of the foot about the skeleton 1525. For example, the foot magnet 1520 may be attracted to the skeleton magnet 1510 when the POS terminal device 110 is rotated into or near the customer position, and the foot magnet 1520 may be attracted to the skeleton magnet 1515 when the POS terminal device 110 is rotated into or near the merchant position. This attraction may add a dampening effect on a user attempting to rotate the device when it is already in the customer position or the merchant position, since the attraction pulls the foot 1505 back to those positions, and thus the POS terminal device 110 requires the user to apply slightly more force to rotate the POS terminal device 110 away from the customer position or the merchant position than the user would have to apply to rotate the POS terminal device 110 when the POS terminal device 110 is in another position.

Figure 15B:
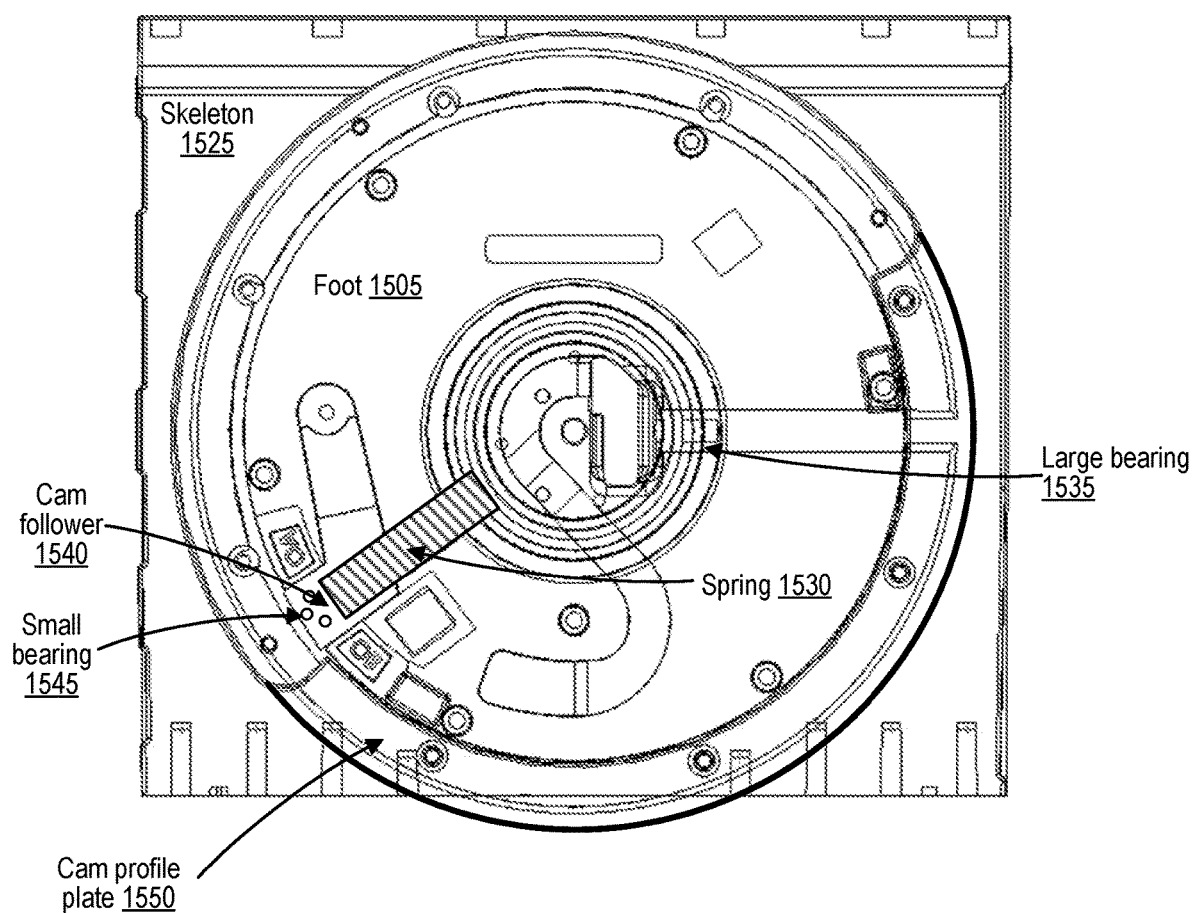
FIG. 15B illustrates a base about which the point of sale (POS) terminal device may rotate that uses spring-based dampener.

FIG. 15B illustrates a base about which the point of sale (POS) terminal device may rotate that uses spring-based dampener.

A similar dampening effect to the effect of FIG. 15A can be achieved using a spring 1530, along with for example a cam follower 1540, a small bearing 1545, a large bearing 1535, and a cam profile plate. Because of the spring 1530, the POS terminal device 110 requires a user to apply slightly more force to rotate the POS terminal device 110 away from the customer position or the merchant position than the user would have to apply to rotate the POS terminal device 110 when the POS terminal device 110 is in another position.

Figure 16A:
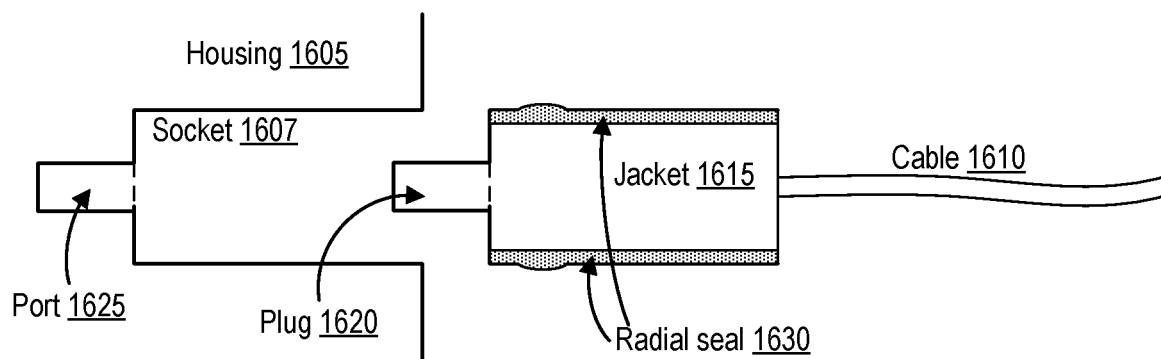
FIG. 16A illustrates a radial liquid ingress prevention seal.

FIG. 16A illustrates a radial liquid ingress prevention seal.

A plug 1620 of a cable 1610 is illustrated being received or ejected by a port 1625 of a housing 1605. A jacket 1615 of the cable 1610 ends in the plug 1620. A socket 1607 of the housing 1605 houses the port 1625. The jacket 1615 of the cable 1610 includes a radial seal 1630 made of an elastomeric material such as silicone or rubber, the radial seal 1630 surrounding the walls of the jacket 1615. The radial seal 1630 provides a snug fit in the socket 1607, preventing liquid (e.g., water) ingress into the port 1625 or plug 1620 once the plug 1620 has been received by the port 1625. The radial seal 1630 is illustrated with a raised "bump" that provides a further tighter seal in a particular area to enhance the seal.

Alternately or additionally, the socket 1607 may include a radial seal on the inner walls of the socket 1607, which provides or enhances the seal therefore water ingress prevention.

Figure 16B:
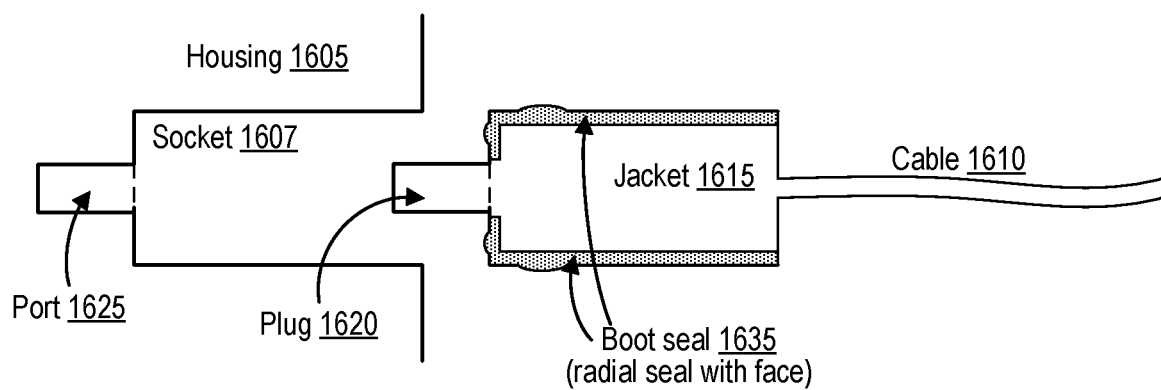
FIG. 16B illustrates a boot liquid ingress prevention seal.

FIG. 16B illustrates a boot liquid ingress prevention seal.

The housing 1605, socket 1607, port 1625, plug 1620, and cable 1610 are all the same in FIG. 16B as in FIG. 16A, except that the jacket 1615 of the cable 1610 includes a boot seal 1635 rather than a radial seal 1630. The boot seal 1635 not only surrounds the walls of the jacket 1615, but also the face of the jacket 1615 around the plug 1620. In some cases, use of the boot seal 1635 of FIG. 16B enhances the seal and therefore liquid ingress prevention even further than the use of the radial seal 1630 as in FIG. 16A.

Alternately or additionally, the socket 1607 may include a boot seal on the inner walls of the socket 1607 and on the inner face of the socket 1607 surrounding the port 1625, which provides or enhances the seal therefore water ingress prevention.

In some cases, a POS terminal device 110 may include a radial seal 1630 or boot seal 1635 as discussed herein to enhance liquid ingress protection and therefore enhance water or liquid resistance or proofing. In some cases, for example, the POS terminal device 110 may include one or more radial seals 1630 and/or boot seals 1635 in the base 150 of the POS terminal device 110.

FIG. 17 is a flow diagram illustrating operations of a tamper detection system that detects tampering with a fastener.

Step 1710 of the operations 1700 includes identifying that a tamper detection circuit is closed. The tamper detection circuit includes a first exposed conductive area 920 and a second exposed conductive area 925 of a flexible member 905. The flexible member 905 includes an aperture through which a portion of a fastener (e.g., a shank 940 of a screw 935) passes while a recess 965 receives the portion of the fastener. The first exposed conductive area 920 is electrically connected to the second exposed conductive area 925 and the tamper detection circuit is closed while the recess 965 receives the portion of the fastener.

Step 1720 of the operations 1700 includes detecting a tamper attempt by identifying that the tamper detection circuit is open. The tamper attempt that is detected may be an attempt to tamper with the flexible member 905, the fastener (e.g., the screw 935), the solid housing 960 that includes the recess 965, an conductive gasket 970 that electrically connects the first exposed conductive area 920 to the second exposed conductive area 925, adhesive 975 on the conductive gasket 970, adhesive 930 on the flexible member 905, a circuit board or other tamper detection circuitry to which the flexible member 905 connects (e.g., optionally including one or more voltage sensors), or some combination thereof.

The operations 1700 of FIG. 17 may represent use of tamper detection systems such as those illustrated in FIGS. 9C-9E or discussed with respect to FIGS. 9A-9E. The fastener referred to in the operations FIG. 17 may refer to a screw 935 or any other fastener discussed with respect to FIGS. 9A-9E.

FIG. 18 is a flow diagram illustrating operations of a tamper detection system that detects tampering with a flexible member that is connected to two connectors.

Step 1810 of the operations 1800 includes identifying that a tamper detection circuit is closed. The tamper detection circuit includes at least one of a plurality of conductive traces of a flexible member. Each of the plurality of conductive traces run between an anterior end of the flexible member and a posterior end of the flexible member. The tamper detection circuit is closed while the anterior end of the flexible member is connected to a first connector and the posterior end of the flexible member is connected to a second connector.

Step 1820 of the operations 1800 includes detecting a tamper attempt by identifying that the tamper detection circuit is open. The tamper attempt that is detected may be an attempt to tamper with the flexible member, the first connector, the second connector, a first circuit board (or other circuitry element) that includes the first connector, the second circuit board (or other circuitry element) that includes the second connector, tamper detection circuitry coupled to either the first connector or the second connector (e.g., on either the first circuit board or the second circuit board and optionally including one or more voltage sensors), or some combination thereof.

The operations 1800 of FIG. 18 may represent use of tamper detection systems such as the system illustrated in and discussed with respect to FIG. 10. The flexible member discussed with respect to the operations 1800 of FIG. 18 may refer to the first flexible member 1020, the second flexible member 1025, or both.

FIG. 19 illustrates an exemplary computing system 1900 that may be used to implement some aspects of the technology. For example, any of the computing devices, computing systems, network devices, network systems, servers, and/or arrangements of circuitry described herein may include at least one computing system 1900, or may include at least one component of the computer system 1900 identified in FIG. 19. The computing system 1900 of FIG. 19 includes one or more processors 1910 and memory 1920. Each of the processor(s) 1910 may refer to one or more processors, controllers, microcontrollers, central processing units (CPUs), graphics processing units (GPUs), arithmetic logic units (ALUs), accelerated processing units (APUs), digital signal processors (DSPs), application specific integrated circuits (ASICs), field-programmable gate arrays (FPGAs), or combinations thereof. Each of the processor(s) 1910 may include one or more cores, either integrated onto a single chip or spread across multiple chips connected or coupled together. Memory 1920 stores, in part, instructions and data for execution by processor 1910. Memory 1920 can store the executable code when in operation. The system 1900 of FIG. 19 further includes a mass storage device 1930, portable storage medium drive(s) 1940, output devices 1950, user input devices 1960, a graphics display 1970, and peripheral devices 1980.

The components shown in FIG. 19 are depicted as being connected via a single bus 1990. However, the components may be connected through one or more data transport means. For example, processor unit 1910 and memory 1920 may be connected via a local microprocessor bus, and the mass storage device 1930, peripheral device(s) 1980, portable storage device 1940, and display system 1970 may be connected via one or more input/output (I/O) buses.

Mass storage device 1930, which may be implemented with a magnetic disk drive or an optical disk drive, is a non-volatile storage device for storing data and instructions for use by processor unit 1910. Mass storage device 1930 can store the system software for implementing some aspects of the subject technology for purposes of loading that software into memory 1920.

Portable storage device 1940 operates in conjunction with a portable non-volatile storage medium, such as a floppy disk, compact disk or Digital video disc, to input and output data and code to and from the computer system 1900 of FIG. 19. The system software for implementing aspects of the subject technology may be stored on such a portable medium and input to the computer system 1900 via the portable storage device 1940.

The memory 1920, mass storage device 1930, or portable storage 1940 may in some cases store sensitive information, such as transaction information, health information, or cryptographic keys, and may in some cases encrypt or decrypt such information with the aid of the processor 1910. The memory 1920, mass storage device 1930, or portable storage 1940 may in some cases store, at least in part, instructions, executable code, or other data for execution or processing by the processor 1910.

Output devices 1950 may include, for example, communication circuitry for outputting data through wired or wireless means, display circuitry for displaying data via a display screen, audio circuitry for outputting audio via headphones or a speaker, printer circuitry for printing data via a printer, or some combination thereof. The display screen may be any type of display discussed with respect to the display system 1970. The printer may be inkjet, laserjet, thermal, or some combination thereof. In some cases, the output device circuitry 1950 may allow for transmission of data over an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. Output devices 1950 may include any ports, plugs, antennae, wired or wireless transmitters, wired or wireless transceivers, or any other components necessary for or usable to implement the communication types listed above, such as cellular Subscriber Identity Module (SIM) cards.

Input devices 1960 may include circuitry providing a portion of a user interface. Input devices 1960 may include an alpha-numeric keypad, such as a keyboard, for inputting alpha-numeric and other information, or a pointing device, such as a mouse, a trackball, stylus, or cursor direction keys. Input devices 1960 may include touch-sensitive surfaces as well, either integrated with a display as in a touchscreen, or separate from a display as in a trackpad. Touch-sensitive surfaces may in some cases detect localized variable pressure or force detection. In some cases, the input device circuitry may allow for receipt of data over an audio jack, a microphone jack, a universal serial bus (USB) port/plug, an Apple® Lightning® port/plug, an Ethernet port/plug, a fiber optic port/plug, a proprietary wired port/plug, a wired local area network (LAN) port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, personal area network (PAN) signal transfer, wide area network (WAN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. Input devices 1960 may include any ports, plugs, antennae, wired or wireless receivers, wired or wireless transceivers, or any other components necessary for or usable to implement the communication types listed above, such as cellular SIM cards.

Input devices 1960 may include receivers or transceivers used for positioning of the computing system 1900 as well. These may include any of the wired or wireless signal receivers or transceivers. For example, a location of the computing system 1900 can be determined based on signal strength of signals as received at the computing system 1900 from three cellular network towers, a process known as cellular triangulation. Fewer than three cellular network towers can also be used—even one can be used—though the location determined from such data will be less precise (e.g., somewhere within a particular circle for one tower, somewhere along a line or within a relatively small area for two towers) than via triangulation. More than three cellular network towers can also be used, further enhancing the location's accuracy. Similar positioning operations can be performed using proximity beacons, which might use short-range wireless signals such as BLUETOOTH® wireless signals, BLUETOOTH® low energy (BLE) wireless signals, IBEACON® wireless signals, personal area network (PAN) signals, microwave signals, radio wave signals, or other signals discussed above. Similar positioning operations can be performed using wired local area networks (LAN) or wireless local area networks (WLAN) where locations are known of one or more network devices in communication with the computing system 1900 such as a router, modem, switch, hub, bridge, gateway, or repeater. These may also include Global Navigation Satellite System (GNSS) receivers or transceivers that are used to determine a location of the computing system 1900 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. Input devices 1960 may include receivers or transceivers corresponding to one or more of these GNSS systems.

Display system 1970 may include a liquid crystal display (LCD), a plasma display, an organic light-emitting diode (OLED) display, an electronic ink or "e-paper" display, a projector-based display, a holographic display, or another suitable display device. Display system 1970 receives textual and graphical information, and processes the information for output to the display device. The display system 1970 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 1980 may include any type of computer support device to add additional functionality to the computer system. For example, peripheral device(s) 1980 may include one or more additional output devices of any of the types discussed with respect to output device 1950, one or more additional input devices of any of the types discussed with respect to input device 1960, one or more additional display systems of any of the types discussed with respect to display system 1970, one or more memories or mass storage devices or portable storage devices of any of the types discussed with respect to memory 1920 or mass storage

1930 or portable storage 1940, a modem, a router, an antenna, a wired or wireless transceiver, a printer, a bar code scanner, a quick-response ("QR") code scanner, a magnetic stripe card reader, a integrated circuit chip (ICC) card reader such as a smartcard reader or a EUROPAY®-MASTER-CARD®-VISA® (EMV) chip card reader, a near field communication (NFC) reader, a document/image scanner, a visible light camera, a thermal/infrared camera, an ultraviolet-sensitive camera, a night vision camera, a light sensor, a phototransistor, a photoresistor, a thermometer, a thermistor, a battery, a power source, a proximity sensor, a laser rangefinder, a sonar transceiver, a radar transceiver, a lidar transceiver, a network device, a motor, an actuator, a pump, a conveyer belt, a robotic arm, a rotor, a drill, a chemical assay device, or some combination thereof.

The components contained in the computer system 1900 of FIG. 19 can include those typically found in computer systems that may be suitable for use with some aspects of the subject technology and represent a broad category of such computer components that are well known in the art. That said, the computer system 1900 of FIG. 19 can be customized and specialized for the purposes discussed herein and to carry out the various operations discussed herein, with specialized hardware components, specialized arrangements of hardware components, and/or specialized software. Thus, the computer system 1900 of FIG. 19 can be a personal computer, a hand held computing device, a telephone ("smartphone" or otherwise), a mobile computing device, a workstation, a server (on a server rack or otherwise), a minicomputer, a mainframe computer, a tablet computing device, a wearable device (such as a watch, a ring, a pair of glasses, or another type of jewelry or clothing or accessory), a video game console (portable or otherwise), an e-book reader, a media player device (portable or otherwise), a vehicle-based computer, another type of computing device, or some combination thereof. The computer system 1900 may in some cases be a virtual computer system executed by another computer system. The computer can also include different bus configurations, networked platforms, multi-processor platforms, etc. Various operating systems can be used including Unix®, Linux®, FreeBSD®, FreeNAS®, pfSense®, Windows®, Apple® Macintosh OS® ("MacOS®"), Palm OS®, Google® Android®, Google® Chrome OS®, Chromium® OS®, OPENSTEP®, XNU®, Darwin®, Apple® iOS®, Apple® tvOS®, Apple® watchOS®, Apple® audioOS®, Amazon® Fire OS®, Amazon® Kindle OS®, variants of any of these, other suitable operating systems, or combinations thereof. The computer system 1900 may also use a Basic Input/Output System (BIOS) or Unified Extensible Firmware Interface (UEFI) as a layer upon which the operating system(s) are run.

In some cases, the computer system 1900 may be part of a multi-computer system that uses multiple computer systems 1900, each for one or more specific tasks or purposes. For example, the multi-computer system may include multiple computer systems 1900 communicatively coupled together via at least one of a personal area network (PAN), a local area network (LAN), a wireless local area network (WLAN), a municipal area network (MAN), a wide area network (WAN), or some combination thereof. The multi-computer system may further include multiple computer systems 1900 from different networks communicatively coupled together via the internet (also known as a "distributed" system).

Some aspects of the subject technology may be implemented in an application that may be operable using a variety of devices. Non-transitory computer-readable storage media refer to any medium or media that participate in providing instructions to a central processing unit (CPU) for execution and that may be used in the memory 1920, the mass storage 1930, the portable storage 1940, or some combination thereof. Such media can take many forms, including, but not limited to, non-volatile and volatile media such as optical or magnetic disks and dynamic memory, respectively. Some forms of non-transitory computer-readable media include, for example, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, or a combination thereof.

Various forms of transmission media may be involved in carrying one or more sequences of one or more instructions to a processor 1910 for execution. A bus 1990 carries the data to system RAM or another memory 1920, from which a processor 1910 retrieves and executes the instructions. The instructions received by system RAM or another memory 1920 can optionally be stored on a fixed disk (mass storage device 1930/portable storage 1940) either before or after execution by processor 1910. Various forms of storage may likewise be implemented as well as the necessary network interfaces and network topologies to implement the same.

While various flow diagrams provided and described above may show a particular order of operations performed by some embodiments of the subject technology, it should be understood that such order is exemplary. Alternative embodiments may perform the operations in a different order, combine certain operations, overlap certain operations, or some combination thereof. It should be understood that unless disclosed otherwise, any process illustrated in any flow diagram herein or otherwise illustrated or described herein may be performed by a machine, mechanism, and/or computing system 1900 discussed herein, and may be performed automatically (e.g., in response to one or more triggers/conditions described herein), autonomously, semi-autonomously (e.g., based on received instructions), or a combination thereof. Furthermore, any action described herein as occurring in response to one or more particular triggers/conditions should be understood to optionally occur automatically response to the one or more particular triggers/conditions.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

The invention claimed is:

1. A point of sale (POS) device, the POS device comprising:
   a housing that receives a computing device;
   a base;
   a swiveling mechanism, wherein the housing swivels about the base using the swiveling mechanism;
   a first connector of the housing, wherein the computing device communicatively couples to the first connector in response to receipt of the computing device at the housing;
   an integrated circuit (IC) chip payment instrument reader within the housing, wherein the IC chip payment instrument reader reads first payment instrument information from a first payment instrument in response to receipt of the first payment instrument within a reading area associated with the IC chip payment instrument reader, wherein the IC chip payment instrument reader transmits the first payment instrument information to the computing device through the first connector;
   an near field communication (NFC) payment instrument reader within the housing, wherein the NFC payment instrument reader reads second payment instrument information from a second payment instrument in response to receipt of the second payment instrument within a reading area associated with the NFC payment instrument reader, wherein the NFC payment instrument reader transmits the second payment instrument information to the computing device through the first connector;
   a second connector of the base; and
   a cable passing from the second connector to the first connector through at least a portion of the swiveling mechanism.

2. The POS device of claim 1, wherein the first payment instrument includes an IC chip that complies with a Europay-Mastercard-Visa (EMV) standard.

3. The POS device of claim 1, wherein the reading area associated with the IC chip payment instrument reader includes a slot in the housing, and wherein the IC chip payment instrument reader includes a first IC chip reader element on a first side of the slot and a second IC chip reader element on a second side of the slot, wherein the IC chip payment instrument reader reads the first payment instrument information from the first payment instrument using one of the first IC chip reader element and the second IC chip reader element.

4. The POS device of claim 3, wherein the IC chip payment instrument reader reads the first payment instrument information from the first payment instrument using the first IC chip reader element in response to receipt of the first payment instrument within the reading area associated with the IC chip payment instrument reader, wherein the IC chip payment instrument reader reads a third payment instrument information from the third payment instrument using the second IC chip reader element in response to receipt of the third payment instrument within the reading area associated with the IC chip payment instrument reader, wherein the IC chip payment instrument reader transmits the third payment instrument information to the computing device through the first connector.

5. The POS device of claim 1, further comprising:
   a magnetic stripe payment instrument reader within the housing, wherein the magnetic stripe payment instrument reader reads second payment instrument information from a third payment instrument in response to receipt of the third payment instrument within a reading area associated with the magnetic stripe payment instrument reader, wherein the magnetic stripe payment instrument reader transmits the third payment instrument information to the computing device through the first connector.

6. The POS device of claim 1, wherein the near field communication (NFC) payment instrument reader includes a NFC antenna coil that includes at least one curved portion.

7. A point of sale (POS) device, the POS device comprising:
   a housing that receives a computing device;
   a base;
   a swiveling mechanism, wherein the housing swivels about the base using the swiveling mechanism;
   a first connector of the housing, wherein the computing device communicatively couples to the first connector in response to receipt of the computing device at the housing;
   an integrated circuit (IC) chip payment instrument reader within the housing, wherein the IC chip payment instrument reader reads payment instrument information from a payment instrument in response to receipt of the payment instrument within a reading area associated with the IC chip payment instrument reader, wherein the IC chip payment instrument reader transmits the payment instrument information to the computing device through the first connector;
   a second connector of the base; and
   a cable passing from the second connector to the first connector through at least a portion of the swiveling mechanism.

8. The POS device of claim 7, wherein the IC chip payment instrument reader includes at least one of a Europay-Mastercard-Visa (EMV) chip payment instrument reader and a near field communication (NFC) payment instrument reader.

9. The POS device of claim 7, wherein the cable supplies power from the second connector to the first connector.

10. The POS device of claim 7, wherein the swiveling mechanism includes at least one of a bearing, a hinge, and a joint.

11. The POS device of claim 7, wherein the swiveling mechanism includes a first bearing and a second bearing, and wherein the cable passes through at least the portion of the swiveling mechanism by passing between the first bearing and the second bearing.

12. The POS device of claim 7, further comprising a detent mechanism that limits the swiveling of the housing about the base to a range of angles.

13. The POS device of claim 12, wherein the detent mechanism includes at least one of a spring, a magnet, and a ramp.

14. The POS device of claim 12, wherein the range of angles includes a first angle and a second angle, wherein a display of the computing device faces a first direction at the first angle, wherein a display of the computing device faces a second direction at the second angle.

15. The POS device of claim 14, wherein the first direction and the second direction are opposite one another.

16. The POS device of claim 15, wherein the first direction is configured to face a merchant, wherein the second direction is configured to face a customer.

17. The POS device of claim 7, further comprising:
a frame, wherein the frame is separate from a surface of the housing while the frame is in an unsecured state, wherein the frame is secured to the surface of the housing while the frame is in a secured state, wherein the frame cradles the computing device while the frame is in the secured state and the housing has received the computing device.

18. The POS device of claim 7, wherein the based is configured to mount to a wall.

19. The POS device of claim 7, wherein the base includes a seal that is configured to prevent liquid ingress to at least a portion of the second connector.

20. A method of facilitating a transaction using a point of sale (POS) device, the method comprising:
receiving a computing device at a housing of the POS device;
initiating a connection between the computing device and a first connector of the housing in response to receiving the computing device at the housing;
transferring power over a cable from a second connector at a base of the POS device to the computing device through the first connector; wherein the cable passes through at least a portion of a swiveling mechanism of the POS device;
swiveling the housing of the POS device about the base of the POS device using the swiveling mechanism of the POS device;
receiving a payment instrument within a reading area associated with an integrated circuit (IC) chip payment instrument reader of the POS device;
reading payment instrument information from the payment instrument using the IC chip payment instrument reader in response to receiving the payment instrument within the reading area associated with the IC chip payment instrument reader; and
transmitting the payment instrument information from the IC chip payment instrument reader to the computing device through the first connector, wherein the computing device is configured to initiate processing of the transaction using the payment instrument information.

* * * * *